(12) United States Patent
Kubo et al.

(10) Patent No.: US 7,876,386 B2
(45) Date of Patent: Jan. 25, 2011

(54) LIQUID CRYSTAL DISPLAY DEVICE WITH GATE LINES OVERLAPPING PIXEL ELECTRODES

(75) Inventors: Masumi Kubo, Ikoma (JP); Akihiro Yamamoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 2 days.

(21) Appl. No.: 12/385,220

(22) Filed: Apr. 2, 2009

(65) Prior Publication Data

US 2009/0231502 A1   Sep. 17, 2009

Related U.S. Application Data

(62) Division of application No. 10/924,892, filed on Aug. 25, 2004, now abandoned.

(30) Foreign Application Priority Data

Aug. 28, 2003 (JP) .............................. 2003-209340

(51) Int. Cl.
G02F 1/141 (2006.01)
G02F 1/1343 (2006.01)
(52) U.S. Cl. .................... 349/37; 349/139; 349/123; 349/143
(58) Field of Classification Search ............... 349/37, 349/41, 42, 54, 56, 73, 74, 123, 128, 129, 349/132, 139, 143, 149, 152
See application file for complete search history.

(56) References Cited

U.S. PATENT DOCUMENTS

| 6,097,452 | A  | 8/2000  | Shimada et al. |
| 6,147,722 | A  | 11/2000 | Shimada et al. |
| 6,342,876 | B1 | 1/2002  | Kim |
| 6,603,524 | B1 | 8/2003  | Shimada et al. |
| 6,661,488 | B1 | 12/2003 | Takeda et al. |
| 6,781,657 | B1 | 8/2004  | Kim et al. |
| 2001/0001567 | A1 | 5/2001 | Lyu et al. |
| 2001/0028414 | A1 | 10/2001 | Lyu et al. |
| 2002/0089485 | A1 | 7/2002 | Youn |
| 2003/0043326 | A1 | 3/2003 | Sawasaki et al. |

(Continued)

FOREIGN PATENT DOCUMENTS

JP   10-104664   4/1998

(Continued)

OTHER PUBLICATIONS

U.S. Appl. No. 10/924,892, filed Aug. 24, 2004, Kubo et al.

*Primary Examiner*—Brian M Healy
(74) *Attorney, Agent, or Firm*—Nixon & Vanderhye P.C.

(57) ABSTRACT

In a liquid crystal display device of the present invention, when a display voltage is applied to picture element electrodes, each picture element electrode forms a plurality of domains in which liquid crystal molecules align themselves in different directions. The picture element electrodes are formed such that their edge portions on the opposite sides of a picture-element-electrode aperture portion formed between the picture element electrodes face parallel to each other with a certain interval. A source bus line is provided along the picture-element-electrode aperture portion formed between the picture element electrodes. The source bus line is disposed beneath the picture element electrodes and at the edge portions of the picture element electrodes by overlapping therewith in a direction of thickness.

14 Claims, 13 Drawing Sheets

U.S. PATENT DOCUMENTS

| | | |
|---|---|---|
| 2003/0174269 A1 | 9/2003 | Tanaka et al. |
| 2004/0201811 A1 | 10/2004 | Jun |
| 2005/0046772 A1 | 3/2005 | Kubo et al. |
| 2005/0062923 A1 | 3/2005 | Lyu et al. |
| 2006/0114402 A1 | 6/2006 | Lyu et al. |
| 2009/0231502 A1 * | 9/2009 | Kubo et al. .................. 349/37 |

FOREIGN PATENT DOCUMENTS

| | | |
|---|---|---|
| JP | 10-333170 | 12/1998 |
| JP | 2002-196731 | 7/2002 |
| JP | 2002-229037 | 8/2002 |
| JP | 2003-228073 | 8/2003 |

* cited by examiner 16    18: INTERLAYER
      INSULATING FILM

104: PROJECTION
103: COUNTER ELECTRODE
101: LIQUID CRYSTAL MOLECULE
102
103a
(OFF-STATE)

104
104
(ON-STATE)

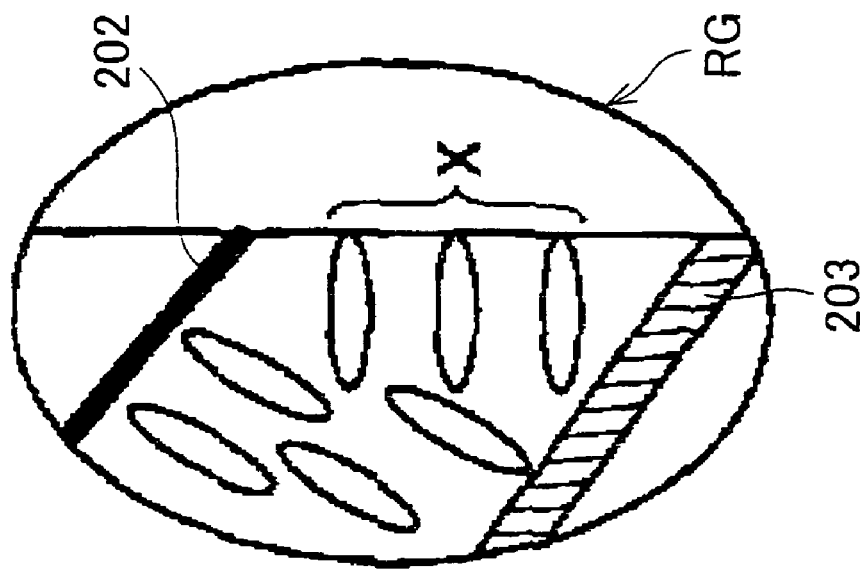
FIG. 11 (b) (Prior Art)
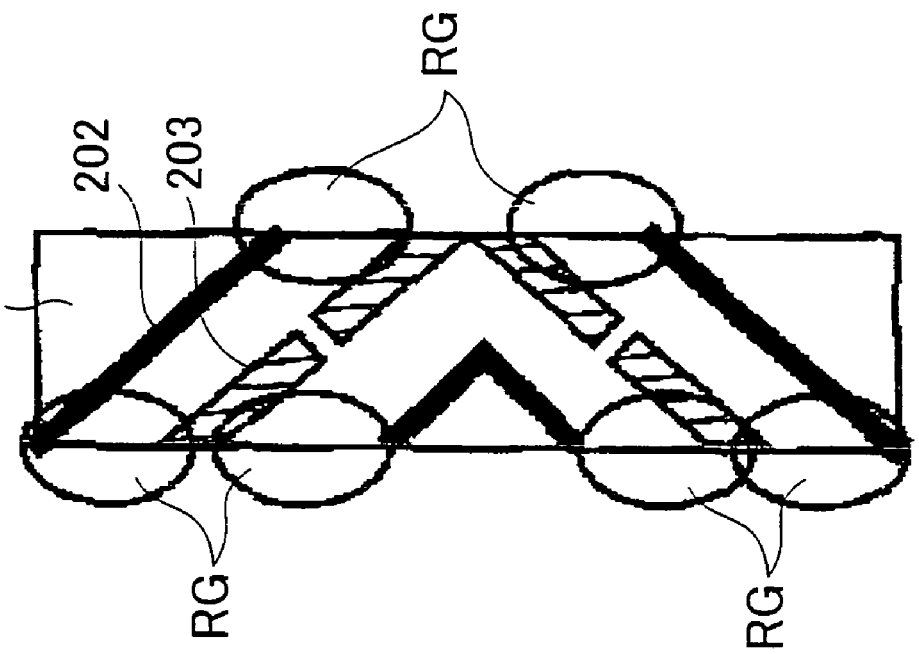
FIG. 11 (a) (Prior Art)

LIQUID CRYSTAL DISPLAY DEVICE WITH GATE LINES OVERLAPPING PIXEL ELECTRODES

This application is a Divisional of Ser. No. 10/924,892, filed Aug. 25, 2004 now abandoned, which claims priority under 35 U.S.C. §119(a) on Patent Application No. 2003/209340 filed in Japan on Aug. 28, 2003, the entire contents of which are hereby incorporated herein by reference in this application.

This Nonprovisional application claims priority under 35 U.S.C. §119(a) on Patent Application No. 2003/209340 filed in Japan on Aug. 28, 2003, the entire contents of which are hereby incorporated by reference.

FIELD OF THE INVENTION

The present invention relates to a liquid crystal display device and, more particularly, to a liquid crystal display device of a so-called multi-domain vertical alignment mode.

BACKGROUND OF THE INVENTION

Conventionally available are liquid crystal display devices of a VA (Vertical Alignment) mode using a vertical alignment film, offering good contrast, good working speed, and good viewing angle characteristics. In recent years, in order to increase viewing angle, there has been developed a multi-domain technique, in which a display pixel is divided into a plurality of domains and the alignment of liquid crystal is varied in these domains.

There are mainly two kinds of substrate structure which can realize such a multi-domain vertical alignment mode.

In a first substrate structure, projections are formed on portions of a base of an alignment film. According to this substrate structure, when voltage is off, liquid crystal molecules align vertically to a surface of the alignment film. However, liquid crystal molecules around the projections slightly tilt with respect to a substrate surface by being affected by a slope of the projections (hereinafter this alignment portion is referred to as a "tilt-aligned portion").

In this substrate structure, when voltage is on, the liquid crystal in the tilt-aligned portion tilts first. Affected by these liquid crystal molecules, the other liquid crystal molecules align themselves one after another in the same direction. As a result, stable alignment is obtained in the entire pixel. That is, with the projections being a starting point, the alignment in the entire display portion is controlled.

In a second substrate structure, instead of forming projections on the TFT substrate side, electrode slits are formed in ITO (Indium Tin Oxide) pixel electrodes. In this substrate structure, when a voltage is applied, a distorted electric field (oblique electric field) is generated in the vicinity of the slit portions, enabling the alignment of the liquid crystal to be controlled with the same electric field distribution as that obtained when a structure is provided. Note that, by forming the slits and ITO pixel electrode together, the number of manufacturing steps can be reduced.

As one kind of such a conventional technique, for example, Japanese Patent No. 2947350 (registered on Jul. 2, 1999) discloses a liquid crystal display device in which a liquid crystal with negative dielectric anisotropy is interposed between a pair of first and second substrates whose surfaces have been treated with a vertical alignment process, and in which the liquid crystal aligns substantially vertically under no applied voltage, substantially horizontal when a predetermined voltage is applied, and obliquely when a voltage smaller than the predetermined voltage is applied. The first substrate includes first domain regulating means for regulating the alignment direction of the liquid crystal that tilts when a voltage smaller than the predetermined voltage is applied. The second substrate includes second domain regulating means for regulating the alignment direction of the liquid crystal that tilts when a voltage smaller than the predetermined voltage is applied. The first domain regulating means includes dielectric projections that are at least provided on electrodes of the first substrate, and that at least project into a liquid crystal layer in such a manner that a surface of the first substrate in contact with the liquid crystal is partially sloped. Under no applied voltage, the liquid crystal in the vicinity of the sloped face aligns substantially vertically to the sloped face. In a transition from a voltage OFF state to ON state, the alignment direction of the liquid crystal in the vicinity of the sloped face under no applied voltage determines the alignment direction of the surrounding liquid crystal.

Specifically, in this liquid crystal display device, as shown in FIG. 10(a), projections 104 are provided on both transparent electrodes 102 and a counter electrode 103, wherein liquid crystal 101 is interposed between the transparent electrodes 102 (pixel electrodes) and the counter electrode 103. The projections 104 provide a pre-tilt 104a for the liquid crystal 101, so as to realize divided alignment under applied voltage (ON state), as shown in FIG. 10(b).

The same effect can also be obtained when slits are formed in the transparent electrodes 102. In this case, when a voltage is applied, a distorted electric field (oblique electric field) is generated in the vicinity of the slit portions as described above, enabling the alignment of the liquid crystal to be controlled with the same electric field distribution as that obtained when the projections are provided.

In a liquid crystal display device of a multi-domain vertical alignment mode as exemplified by this conventional example, in order to widen the viewing angle in all four directions, as shown in FIG. 11(a), a counter electrode projection 202 and a pixel electrode slit 203 may be formed parallel to each other and with a tilt with respect to pixel electrodes 201. Note that, the pixel electrodes 201 are arranged side by side by sandwiching pixel aperture portions in between (not shown).

However, in this case, the liquid crystal alignment is disturbed at an edge portion X by the pixel aperture portion between the pixel electrodes 201, as can be seen in a magnified portion RG in the vicinity of a long side of the pixel electrodes 201 in FIG. 11(b).

In order to overcome such a drawback, in Japanese Publication for Unexamined Patent Application No. 229037/2002 (Tokukai 2002-229037, published on Aug. 14, 2002), pixel electrodes 211 are bent in a W-shaped zigzag fashion along counter electrode projections 212, as shown in FIG. 12. With this, as shown in FIG. 13, liquid crystal alignment 213 lines up between the counter electrode projections 212 and an edge portion M of the pixel electrodes 211.

On the other hand, as shown in FIG. 3(a) which is an explanatory diagram of the present invention, in a liquid crystal display device in which picture element electrodes 12 and source bus lines 16 are provided on substantially the same plane and the edge portions of the source bus lines 16 do not overlap thicknesswise with the picture element electrodes 12 on the both sides of the picture-element-electrode aperture portions 13, liquid crystal molecules 3a tilt in opposite directions by the oblique electric fields respectively generated on the edges of each source bus line 16 and the edges of the picture element electrodes 12.

As a result, the alignment is disturbed in the gap between the source bus line 16 and the picture element electrode 12.

To overcome such a drawback, in the above Japanese Patent No. 2947350, as shown in FIG. 14, pixel electrode aperture portions 301 formed in the transparent electrodes are bent in a zigzag fashion for example, and the pixel electrodes 302 accordingly are also formed in a zigzag fashion. A data bus line 303 is provided between the pixel electrodes 302, with a gap on both sides of the data bus line 303. Moreover, projections 304 are formed on and along the data bus line 303. Each pixel electrode 302 has a pixel electrode projection 305, and a counter electrode has counter electrode projections 306, which are provided in parallel on both sides of the picture element electrode projection 305.

With this arrangement, the projection 304 on the data bus line 303 can suppress alignment disorder caused by the data bus line 303.

However, in the conventional liquid crystal display device disclosed in Japanese Patent No. 2947350, there is the problem of increased manufacturing steps, because the projection 304 needs to be formed on the data bus line 303.

That is, in the liquid crystal display device disclosed in the above Japanese Patent No. 2947350, it is difficult to control alignment since the oblique electric field between the data bus line 303 and the edges of each pixel electrode 302 is used for alignment control. As a result, there is a problem that the alignment needs to be controlled by forming projections on the data bus line 303 of the counter electrode.

Moreover, in the conventional liquid crystal display device disclosed in the above Japanese Patent No. 2947350, passage of light through the gap D between the data bus line 303 and the pixel electrode 302 needs to be prevented. As a result, there is a problem that the aperture ratio decreases. Especially, in the case that a light-shielding layer is formed on a substrate facing the substrate on which the data bus line 303 and the pixel electrode 302 are formed, passage of light through the gap D between the data bus line 303 and the pixel electrode 302 needs to be prevented even if there is misregistration during assembly of the substrates. In this case, a large portion of the pixel electrodes 302 needs to be blocked, with the result that the aperture ratio greatly decreases.

SUMMARY OF THE INVENTION

The present invention was made to solve the above conventional problems, and an object of the invention is to provide a liquid crystal display device in which alignment control is efficiently carried out between picture element electrodes. The present invention therefore provides a liquid crystal display device that can realize domain division with strong alignment regulating force and superior response characteristics, without forming a projection on the bus line and without lowering aperture ratio.

To solve the above problems, the present invention provides a liquid crystal display device in which a liquid crystal layer is interposed between a first substrate having a plurality of picture element electrodes and a second substrate having a counter electrode, the liquid crystal display device applying a display voltage to each picture element electrode by selecting it with a bus line including a gate bus line and a source bus line, and, in response to the applied display voltage to the picture element electrodes, forming a plurality of domains within a region of a single picture element electrode, the alignment direction of the liquid crystal molecules being different in each domain. In the liquid crystal display device, the picture element electrodes are formed in such a manner that their edge portions face parallel to each other with a certain interval by sandwiching picture-element-electrode aperture portions in between, and the bus line is provided (i) along the picture-element-electrode aperture portion provided between the picture element electrodes, (ii) beneath the picture element electrodes, and (iii) at the edge portions of each picture element electrodes by overlapping with the edge portions in a direction of thickness.

According to the above invention, when a display voltage is applied to picture element electrodes, the liquid crystal display device of the present invention performs display by forming a plurality of domains with different tilt directions for the liquid crystal molecules within a region of a single picture element electrode.

In the liquid crystal display device, the bus lines such as the source bus lines are generally provided in each picture-element-electrode aperture portions. In this case, the bus line affect the alignment imparted by the picture element electrodes. Therefore, conventionally, the adverse effect of the bus lines on the picture element electrodes has been suppressed by, for example, forming projections at the bus lines.

However, in the present invention, the edge portions of the picture element electrodes on the opposite sides of the aperture portions provided between the picture element electrodes are facing parallel to each other with a certain interval. Since the liquid crystal molecules are tilted by the oblique electric fields generated by the edge portions of the picture element electrodes on the opposite sides of the aperture portion, it is possible to form liquid crystal domains in which the tilt alignment of the liquid crystal molecules at every edge of the picture element electrodes evenly conforms to the tilt alignment of the liquid crystal molecules in each region of the picture element electrodes.

That is, in the present invention, the alignment of the liquid crystal molecules is controlled by effectively using the oblique electric fields generated by the aperture portions, in other words, the oblique electric fields generated by the edges of the picture element electrodes.

As a result, it is unnecessary to form projections on the bus lines. Therefore, the number of manufacturing steps will not increase.

Moreover, in the present invention, the bus lines are provided (i) along the aperture portions formed between the picture element electrodes, (ii) beneath the picture element electrodes, and (iii) at the edge portions of the picture element electrodes by overlapping therewith in a direction of thickness.

Thus, the edges of each bus line are covered with the picture element electrodes. Therefore, in the vicinity of the aperture portion of the picture element electrodes, the effect of the oblique electric fields generated in the vicinity of the edges of the bus line is electrically blocked (shielded) by the picture element electrodes. Accordingly, the liquid crystal molecules in the liquid crystal layer do not receive the alignment regulating force of the oblique electric fields generated in the vicinity of the edges of the bus line, and the alignment of the liquid crystal molecules is regulated only by the oblique electric fields generated on the edge portions of the aperture portion.

Therefore, there will be no alignment disturbance in the liquid crystal domains formed on the picture element electrodes which overlap with the bus lines. As a result, it is possible to suppress decrease of response speed (deterioration of response characteristics) and generation of the after-image phenomenon.

Moreover, because the bus lines overlap with the edge portions of the picture element electrodes, there is no gap between the bus lines and the picture element electrodes. Therefore, unlike the conventional examples, there will be no decrease in the aperture ratio caused by blocking the passage of light through the gap between the bus lines and the picture element electrodes.

Therefore, by effectively controlling alignment of the picture element electrodes, the liquid crystal display device can realize domain division without forming projections on the bus lines and without lowering aperture ratio. The domain division can also be realized with strong alignment regulating force for the liquid crystal and with superior response characteristics.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 11(a) is a plan view showing a picture element region in another conventional liquid crystal display device.

FIG. 11(b) is a plan view magnifying an RG portion shown in FIG. 11(a).

DESCRIPTION OF THE EMBODIMENTS

Figure 1:
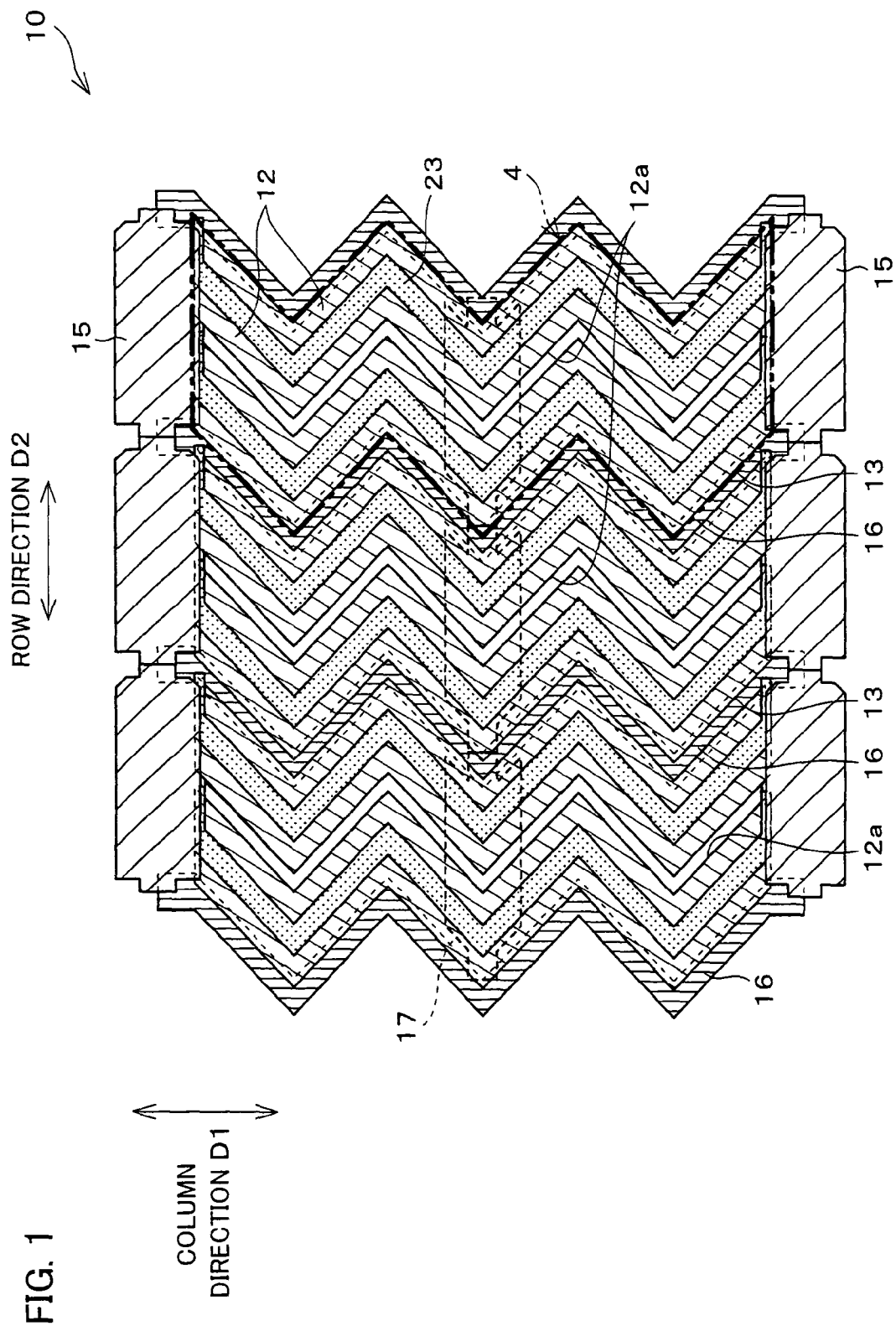
FIG. 1 is a plan view of a liquid crystal panel, showing one embodiment of a liquid crystal display device of the present invention.
Figure 2:
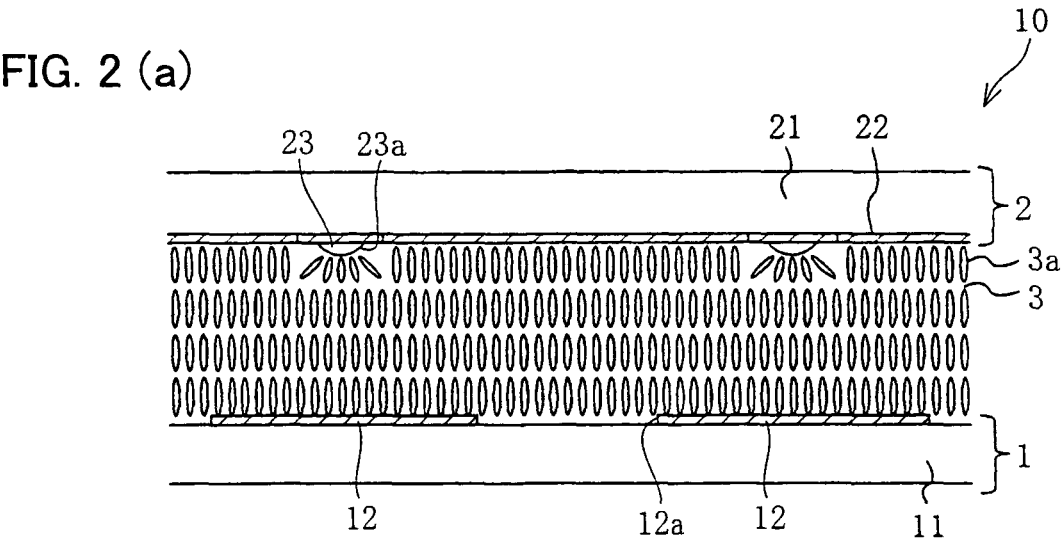
FIG. 2(a) is a cross sectional view schematically showing a cross sectional structure of a picture element region under no applied voltage in the liquid crystal display device.
FIG. 2(b) is a cross sectional view showing a state (initial ON-state) in which alignment has started to change in the picture element region in the liquid crystal display device.
FIG. 2(c) is a cross sectional view showing a steady state in the picture element region in the liquid crystal display device.
Figure 2:
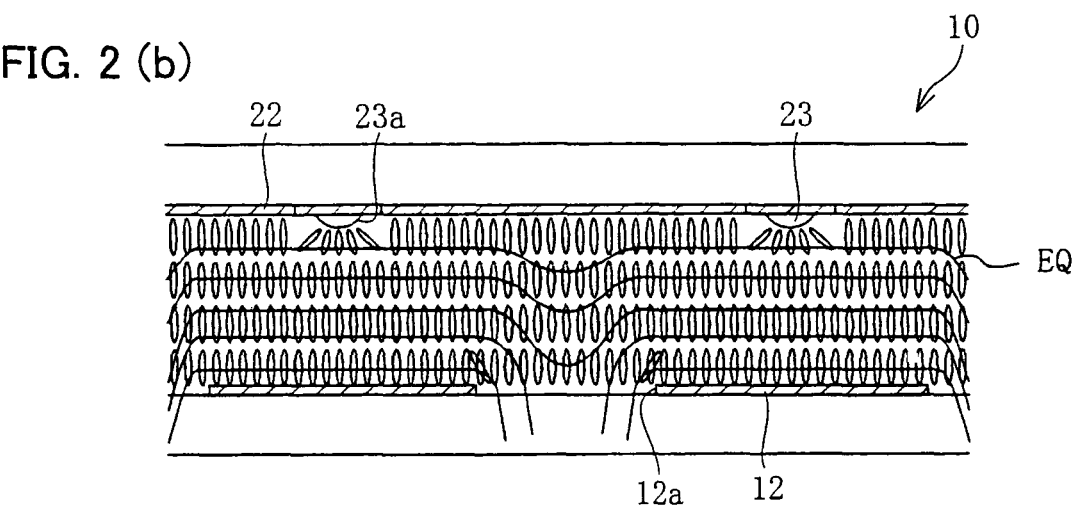
Figure 2:
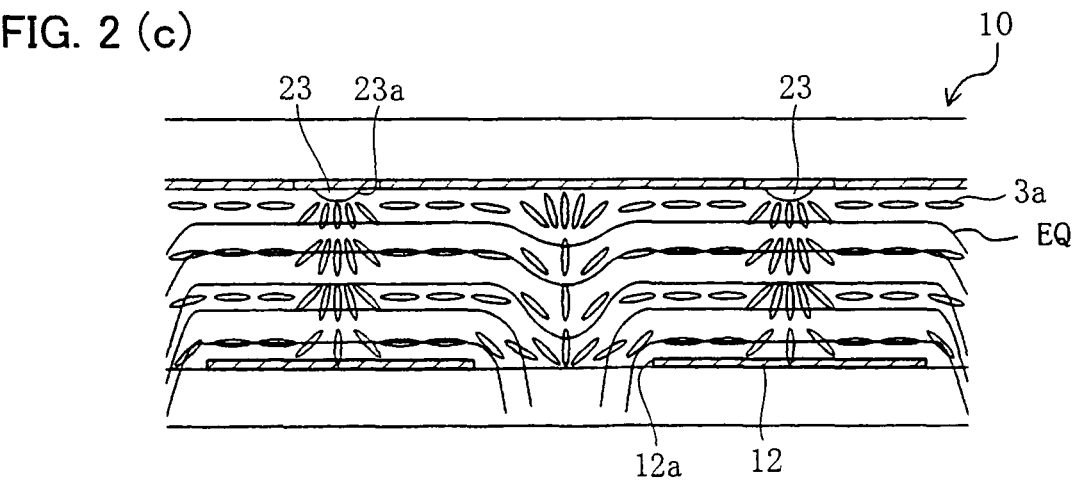
Figure 3:
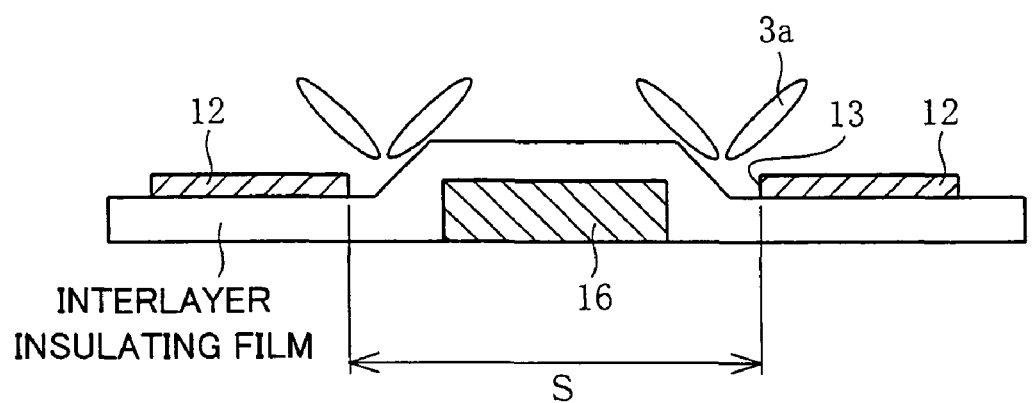
FIG. 3(a) is a cross sectional view showing a bus line provided between picture element regions without overlapping therewith.
FIG. 3(b) is a cross sectional view showing a bus line provided between picture element regions by overlapping therewith.
Figure 3:
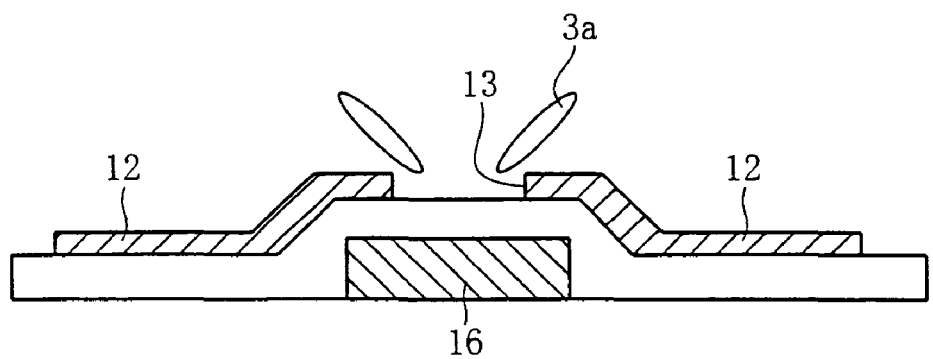

The following description deals with one embodiment of the present invention with reference to FIGS. 1 through 9. Note that, an active matrix type liquid crystal display device using a thin film transistor (TFT) is explained in the present embodiment. Moreover, a transmissive liquid crystal display device is explained as an example; however, the present invention is not limited to this and is also applicable to a reflective liquid crystal display device and a transflective liquid crystal display device. Furthermore, the present invention is applicable to a liquid crystal display device employing either a normally black mode or normally white mode.

Moreover, as used herein, the term "picture element region" is used to mean a region of the liquid crystal display device which corresponds to a "picture element," which is a minimum unit of display. In a color liquid crystal display device, "picture elements" of R, G, and B correspond to a single "pixel." In the active matrix type liquid crystal display device, a picture element region is defined by a picture element electrode and a counter electrode which faces the picture element electrode. To be more exact, in an arrangement in which a black matrix is provided, the picture element region corresponds to a region which corresponds to an aperture portion of the black matrix provided in a region to which a voltage is applied according to an intended state of display.

Referring to FIG. 1, and FIGS. 2(a) through 2(c), the following description deals with a structure of a picture element region of a liquid crystal display device 10 of the present embodiment. Note that, in these figures, a switching element, a color filter, a black matrix, and the like are omitted for simplicity.

As shown in FIG. 2(a), the liquid crystal display device 10 of the present embodiment includes an active matrix substrate 1 as a first substrate (hereinafter referred to as a "TFT substrate"), a counter substrate as a second substrate (also referred to as a "color filter substrate"), and a liquid crystal layer 3 provided between the TFT substrate 1 and the counter substrate 2.

Liquid crystal molecules 3a in the liquid crystal layer 3 have negative dielectric anisotropy. When no voltage is applied to the liquid crystal layer 3, a vertical alignment film (a vertical alignment layer (not shown)) aligns the liquid crystal molecules 3a vertically to its surface. The vertical alignment film is provided on the surfaces of the TFT substrate 1 and the counter substrate 2 on the liquid crystal layer 3 side. That is, the liquid crystal layer 3 initially has a vertically aligned state. However, depending on the type of vertical alignment film or liquid crystal material, the liquid crystal molecules 3a of the liquid crystal layer 3 in a vertically aligned state may slightly tilt with respect to a normal line of the surface of the vertical alignment film, that is, the substrate surface. Generally, the vertically aligned state is defined as a state in which the axis of liquid crystal molecules (also referred to as an "axis azimuth") is tilted with respect to the surface of the vertical alignment film at an angle of about 85 degrees or greater.

The TFT substrate 1 of the liquid crystal display device 10 includes a transparent substrate 11 (for example, a glass substrate) and picture element electrodes 12, which are transparent electrodes formed on a surface of the transparent substrate 11. The counter substrate 2 includes a transparent substrate 21 (for example, a glass substrate) and a counter electrode 22, which is a transparent electrode formed on a surface of the transparent substrate 21. The aligned state of the liquid crystal layer 3 in each picture element region changes according to a voltage applied to the picture element electrodes 12 and the counter electrode 22, which are placed face to face via the liquid crystal layer 3. The liquid crystal display device 10 performs display, by the phenomenon in which a polarization state or quantity of light passing through the liquid crystal layer 3 changes according to a change in the aligned state of the liquid crystal layer 3.

The picture element electrodes 12 of the TFT substrate 1 have a plurality of picture element slits 12a (picture-element-region alignment regulating means, picture-element aperture portion). The picture element slits 12a are portions of the picture element electrodes 12 where a conductive layer (for example, ITO film), which constitutes the picture element electrodes 12, is not formed, that is, where the conductive layer has been removed in a slit shape. That is, the picture element slits 12a are openings with the width (orthogonal to the length) markedly shorter than the length.

As shown in FIG. 1, each picture element slit 12a has sides which extend in a W-shaped zigzag pattern in 45° angle directions with respect to a long side and short side (a column direction and a row direction of the matrix array) of a liquid crystal panel. Accordingly, the picture element electrodes 12 also have a zigzag pattern. Note that, the picture element slits 12a are provided as openings in a picture element region 4 indicated by chain double-dashed lines in FIG. 1. Therefore, portions connected to a gate bus line 15 (to be described later) fall within the picture element region 4.

Moreover, as shown in FIG. 2(a), the counter substrate 2 has counter ribs 23 (picture-element-region alignment regulating means, projections) that project into the liquid crystal layer 3 at positions opposite and along the zigzag pattern of the picture element electrodes 12. Accordingly, as shown in FIG. 1, the counter ribs 23 also have a zigzag pattern of a V-shape repeating units. In the present embodiment, the zigzag pattern of the counter ribs 23 is defined by three "V"s. However, the present invention is not limited to this, and the zigzag pattern of the counter ribs may be two "V"s, or four or more "V"s.

As shown in FIG. 2(a), each counter rib 23 has a slope 23a. The surface of the counter rib 23 renders vertical alignment. That is, a vertical alignment film (not shown) is formed around the counter ribs 23.

Therefore, as shown in FIG. 2(a), the liquid crystal molecules 3a around the counter ribs 23 align substantially vertically to the slope 23a by the anchoring effect of the slope 23a. When a voltage is applied to the liquid crystal layer 3 in such a state, equipotential lines EQ are formed as shown in FIG. 2(b). As shown in FIG. 2(c), by the equipotential lines EQ, the other liquid crystal molecules 3a in the vicinity of the counter ribs 23 tilt to coincide with the direction of tilt alignment on the slope 23a created by the anchoring effect. Moreover, the liquid crystal molecules 3a in the vicinity of the picture element slits 12a also align along the equipotential lines EQ, so that the liquid crystal molecules 3a also tilt around the picture element slits 12a.

Here, the following description deals with a mechanism by which liquid crystal domains are formed in the liquid crystal display device 10. Note that, FIGS. 2(b) and 2(c) show a state in which a voltage is applied to the liquid crystal layer 3 shown in FIG. 2(a). FIG. 2(b) schematically shows a state (an initial ON-state) in which the alignment of the liquid crystal molecules 3a has started to change in response to a voltage applied to the liquid crystal layer 3, and FIG. 2(c) schematically shows a state in which the alignment of the liquid crystal molecules 30a, which has changed in response to applied voltage, has reached a steady state.

Generally, the liquid crystal molecules 3a on a level surface aligns vertically to the surface by the alignment regulating force of the surface (typically, a surface of the vertical alignment film) rendering vertical alignment. A torque acts on the liquid crystal molecules 3a, which have negative dielectric anisotropy, so that the axis azimuth of the liquid crystal molecules 3a aligns parallel to the equipotential lines, that is, vertical to an electric flux lines. In the case that an electric field, which is represented by the equipotential lines vertical to the axis azimuth of the liquid crystal molecules 3a, is applied to the liquid crystal molecules 3a in the vertical alignment state, the liquid crystal molecules 3a tilt either in a clockwise direction or counterclockwise direction at equal probability by the torque acting on the liquid crystal molecules 3a. Therefore, the liquid crystal molecules 3a in the liquid crystal layer 3 disposed between the parallel plate electrodes of a vis-à-vis arrangement are under the torque of both clockwise direction counterclockwise direction. As a result, the liquid crystal molecules 3a may not change smoothly to the alignment state as intended by the voltage applied to the liquid crystal layer 3.

As shown in FIG. 2(a), in the liquid crystal display device 10, in the case that the picture element electrodes 12 and the counter electrode 22 have the same potential (initial alignment state under no applied voltage to the liquid crystal layer 3), the liquid crystal molecules 3a in the picture element region (on the picture element electrode 12 and the picture element slit 12a) align vertically to the surfaces of the picture element electrode 12 and the counter electrode 22. Here, the liquid crystal molecules 3a in contact with the vertical alignment film (not shown) on the slopes 23a of the counter ribs 23 align vertically to the slopes 23a. Moreover, the liquid crystal molecules 3a in the vicinity of the slopes 23a tilt in the manner shown in the figure by interacting with surrounding liquid crystal molecules 3a (property of elastic body).

Next, as shown in FIG. 2(b), when a voltage is applied to the liquid crystal layer 3, a potential gradient, as represented by equipotential lines EQ, is formed in the liquid crystal layer 3. The equipotential lines EQ are (i) parallel to the surfaces of the picture element electrodes 12 and the counter electrode 22 between the picture element electrodes 12 and the counter electrode 22, (ii) inclined on edge portions of the picture element slits 12a in the liquid crystal layer 3, and (iii) curved in regions corresponding to the picture element slits 12a and the counter ribs 23.

As a result, as shown in FIG. 2(c), on the left side of each counter rib 23 in the figure, the liquid crystal molecules 3a tilt (rotate) in a clockwise direction and parallel to the equipotential lines, and on the right side of each counter rib 23 in the figure, the liquid crystal molecules 3a tilt (rotate) in a counterclockwise direction and parallel to the equipotential lines.

Next, when the change of alignment, which starts from the liquid crystal molecules 3a in the vicinity of the slopes 23a of the counter ribs 23, progresses and reaches to a steady state, the alignment becomes a state as shown in FIG. 2(c). Here, the liquid crystal molecules 3a near the center of each picture element slit 12a are substantially equally affected by the alignment of the liquid crystal molecules 3a in the vicinity of the slopes 23a provided on the both sides of the picture element slit 12a, and therefore keep aligned vertically to the equipotential lines. On the other hand, the liquid crystal molecules 3a away from the center of the picture element slit 12a tilt by being affected by the alignment of the liquid crystal molecules in the vicinity of the picture element slit 12a. As a result, the tilt alignment becomes symmetrical about the center of each counter rib 23 and the center of each picture element slit 12a.

In the liquid crystal display device 10, the alignment of the liquid crystal layer 3 is regulated by the zigzag patterns of the picture element slits 12a and the counter ribs 23 formed in the picture element region 4. As a result, when a voltage is applied, the liquid crystal molecules 3a in the picture element region 4 align in four directions, the angles of which being integer multiples of 90 degrees. That is, the picture element region in the liquid crystal display device 10 is divided into a plurality of domains with different alignment directions. This enables the liquid crystal display device 10 to have desirable viewing angle characteristics.

Moreover, the alignment regulating force rendered by the slope 23a of the counter rib 23 acts regardless of applied voltage. Further, the alignment regulating force is a very strong force, as it is known to generate the anchoring effect for the alignment film. Therefore, the liquid crystal molecules 3a in the vicinity of the slope 23a of the counter rib 23 retain the same alignment direction even if the alignment state is disturbed by a flow of liquid crystal material caused by an external force applied to the liquid crystal panel. Therefore, once the flow of the liquid crystal material stops, the liquid crystal molecules 3a in the liquid crystal layer 3 restore their alignment easily as a whole. Thus, the liquid crystal display device 10 is strong against external force. Therefore, the liquid crystal display device 10 can be suitably used for a PC (Personal Computer) or PDA (Personal Digital Assistant), which are often subjected to external forces and are often carried around.

Next, one example of a structure of the liquid crystal display device 10 is explained.

For example, in the present embodiment, a thickness (cell thickness) of the liquid crystal layer 3 is 4 μm, and liquid crystal with negative dielectric anisotropy is enclosed therein. Moreover, the vertical alignment film (not shown) is coated on the surfaces of the TFT substrate 1 and the counter substrate 2, that is, exposed portions of the picture element electrodes 12, the picture element slits 12a, the counter electrode 22, and the counter ribs 23.

The picture element slits 12a formed in the picture element electrode 12 each have a width of 17 μm. The picture element slit 12a is provided for each picture element electrode 12.

Forming the counter ribs 23 with a highly transparent dielectric material is advantageous because it enables the liquid crystal domains, which are formed by respectively corresponding to the picture element slits 12a, to improve their contribution to the display. On the other hand, forming the counter ribs 23 with a non-transparent dielectric material is advantageous in preventing light leakage caused by retardation of the liquid crystal molecules 3a whose alignment is tilted by the slopes 23a of the counter ribs 23. Whether to use a transparent dielectric or non-transparent dielectric may be decided depending on intended use of the liquid crystal display device. In either case, the process of patterning carried out in conformity with the picture element slits 12a can be simplified when the counter ribs 23 are made of a photosensitive resin.

Each counter rib 23 measures 12 μm in width and 1.5 μm in height.

The domain regulating ability of the counter ribs 23 can be obtained when the height thereof is 0.3 μm or greater. However, in order to obtain a satisfactory domain regulating ability, the height should preferably be 1 μm or greater. The upper limit of the height is the thickness of the liquid crystal layer 3. This is effective in suppressing any alignment disturbance caused when the display panel is pressed. However, a drawback is that light leakage occurs in the vicinity of the counter ribs 23 when black display is performed. Therefore, if contrast is important, the counter ribs 23 should not be high, and should preferably be about 1.5 μm. More specifically, in this case, the height of the counter ribs 23 should preferably be not less than 1 μm and not more than 1.5 μm.

Next, description is made as to how bus wiring is made to the picture element electrodes 12, with reference to FIG. 1.

First, in the present embodiment, depending on how picture-element-electrode aperture portions 13 between the picture element electrodes 12 are positioned relative to the edges of bus lines (a group of wiring) provided in the TFT substrate 1, the provision of the zigzag electrode structure as above may not be sufficient to adequately improve display quality.

Thus, in the liquid crystal display device 10 of the present embodiment, the picture-element-electrode aperture portions 13 between the picture element electrodes 12, and the edges of the bus lines are positioned to satisfy a predetermined positional relationship, so as to realize high quality display.

The following description deals with the positional relationship between the picture-element-electrode aperture portions 13 of the picture element electrodes 12 and the edges of the bus lines in the liquid crystal display device 10 of the present embodiment.

As shown in FIG. 1, the TFT substrate 1 of the liquid crystal display device 10 includes the picture element electrodes 12 provided in each picture element region 4, TFTs (not shown) as a switching element electrically connected with the picture element electrodes 12, and bus lines. The bus lines include the gate bus lines 15 as scanning lines electrically connected with the TFTs, and source bus lines 16 as signal lines. In the present embodiment, the bus lines further include auxiliary capacitance lines 17 for forming an auxiliary capacitance.

In the present embodiment, as shown in FIG. 1, the picture element regions 4 have a W-shaped zigzag pattern. Accordingly, the picture-element-electrode aperture portions 13 between the picture element electrodes 12 also have a zigzag pattern.

Therefore, in the present embodiment, the source bus lines 16 are disposed along and beneath the picture-element-electrode aperture portions 13 which are bent in a zigzag pattern. Moreover, the source bus lines 16 are formed to overlap thicknesswise with the edge portions of the picture element electrodes 12. That is, when viewed from the TFT substrate 1 side, the source bus lines 16 cover the picture-element-electrode aperture portions 13 between the picture element electrodes 12. When viewed from the counter substrate 2 side, the edges of the source bus lines 16 are covered by the picture element electrodes 12 between which the picture-element-electrode aperture portions 13 are provided. Note that, instead of the source bus lines 16, the gate bus lines 15 may be formed to overlap with the picture element electrodes 12.

As above, in the present embodiment, the edge portions of the source bus lines 16 overlap thicknesswise with the picture element electrodes 12 on the both sides of the picture-element-electrode aperture portions 13. This realizes high quality display.

This reason for this is explained below by comparing with a construction in which the edge portions of the source bus lines 16 do not overlap thicknesswise with the picture element electrodes 12 on the both sides of the picture-element-electrode aperture portions 13.

First, when driving the liquid crystal display device 10, a predetermined signal (voltage) for driving the liquid crystal display device 10 is applied to the source bus lines 16 provided on the TFT substrate 1. As a result, an electric field is generated between the source bus lines 16 and the counter substrate 2. In the case that the edges of the source bus lines 16 are not shielded by other electrodes, oblique electric fields, which affect the alignment of the liquid crystal molecules 3a, are generated in the vicinity of the edges of the source bus lines 16. The alignment regulating force generated by the oblique electric fields does not match the alignment regulating force of the oblique electric fields generated at the edge portions of the aperture portions 13 between the picture element electrodes 12. Therefore, when the liquid crystal domains, which are formed on the aperture portions 13 adjacent to the source bus lines 16, receive the alignment regulating force generated by the oblique electric fields in the vicinity of the edges of the source bus lines 16, the alignment is disturbed and the tilt alignment state becomes irregular.

For example, consider a liquid crystal display device shown in FIG. 3(a) in which the picture electrodes 12 and the source bus lines 16 are provided substantially on the same plane and the edges of the source bus lines 16 do not overlap thicknesswise with the picture element electrodes 12 on the both sides of the aperture portions 13. In such a liquid crystal display device, the alignment of the liquid crystal molecules 3a in the vicinity of the aperture portions 13 provided between the picture element electrodes 12 adjacent to the source bus lines 16 is tilted in opposite directions in the oblique electric fields generated at the edges of the source bus lines 16 and the oblique electric fields generated at the edges of the picture element electrodes 12. That is, the oblique electric fields on the edges of the source bus lines 16 tilts the liquid crystal molecules 3a as depicted by the inner two liquid crystal molecules 3a shown in FIG. 3(a). On the other hand, the oblique electric fields on the edges of the picture element electrodes 12 tilts the liquid crystal molecules 3a as depicted by the outer two liquid crystal molecules 3a shown in FIG. 3(a).

As a result, the alignment is disturbed in the gap between the source bus lines 16 and the picture element electrodes 12. The alignment disturbance may be hidden by shielding the gap between the source bus lines 16 and the picture element electrodes 12. However, this decreases the aperture ratio.

One way to prevent such alignment disturbance is to form projections on the source bus lines 16. Note that, this method is disclosed in Japanese Patent No. 2947350, which was explained in the BACKGROUND OF THE INVENTION section.

However, the technique of forming projections on the source bus lines 16 involves an increased number of manufacturing steps when a slit is used to realize the picture-element-region alignment regulating means provided on the pixel electrode side, because in this case a different manufacturing method needs to be used.

In order to solve this problem, as shown in FIG. 3(b), the source bus lines 16 may be covered with the picture element electrodes 12. However, in this case, a capacitance between the source bus lines 16 and the picture element electrodes 12 (source bus line-pixel electrode capacitance) increases. Therefore, when an input signal to the source bus lines 16 has the same phase as that supplied to the picture element electrodes 12, the effect of the oblique electric fields generated on the edges of the picture element electrodes 12 drastically decreases, and the alignment is disturbed.

Figure 4:
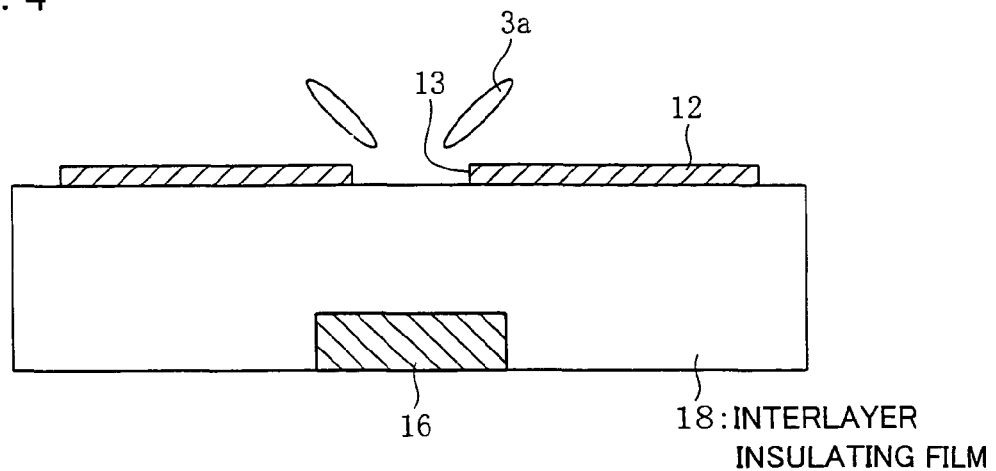
FIG. 4 is a cross sectional view schematically showing an aligned state of liquid crystal molecules near an aperture portion provided in the vicinity of a source bus line in the liquid crystal display device.

In light of such a drawback, in the liquid crystal display device 10 of the present embodiment, as shown in FIG. 4, the edges of the source bus lines 16 overlap thicknesswise with the picture element electrodes 12 on the both sides of the aperture portions 13. Moreover, the source bus lines 16 are provided beneath the picture element electrodes 12, and a thick layer of interlayer insulation film 18 is provided between the picture element electrodes 12 and the source bus lines 16. Therefore, the picture element electrodes 12 covers the edges of the source bus lines 16 in the vicinity of the aperture portions 13 provided between the picture element electrodes 12 overlapping with the source bus lines 16.

Thus, in the vicinity of the aperture portions 13 between the picture element electrodes 12 which overlap with the source bus lines 16, the effect of the oblique electric fields generated in the vicinity of the edges of the source bus lines 16 is electrically blocked (shielded) by the picture element electrodes 12. Therefore, the liquid crystal molecules 3a in the liquid crystal layer 3 are not affected by the alignment regulating force of the oblique electric fields generated in the vicinity of the edges of the source bus line 16, and the alignment of the liquid crystal molecules 3a is regulated only by the oblique electric fields generated at the edge portions of the aperture portion 13.

Therefore, in the liquid crystal display device 10 of the present embodiment, the source bus lines 16 do not disturb the alignment of liquid crystal domains formed on the picture element electrodes 12 which overlap with the source bus lines 16. As a result, it is possible to suppress decrease of response speed (deterioration of response characteristics) and generation of the afterimage phenomenon, and high quality display is realized.

The liquid crystal molecules 3a tilt in opposite directions by the oblique electric fields generated between the edges of the picture element electrodes 12. The alignment disturbance caused by such alignment of the liquid crystal molecules 3a can be hidden when the source bus lines 16 are made of a light-shielding material.

As a result, it is possible to prevent the aperture ratio from decreasing, and to prevent the alignment disturbance caused by the oblique electric fields generated on the edges of the source bus lines 16. The alignment disturbance can be prevented without increasing the number of steps in the manufacturing process.

In this case, alignment control is possible because the effect of the source bus lines 16 is small even when adjacent ones of the picture element electrodes 12 have the same phase. Moreover, as will be described later, because the phase of an applied voltage to the liquid crystal layer is reversed between adjacent picture element electrodes 12 (hereinafter referred to as "dot inversion"), a potential difference between adjacent ones of the picture element electrodes 12 further increases. As a result, alignment becomes more stable.

Further details are explained below.

The oblique electric fields, which are generated in the vicinity of the edges of the source bus lines 16 and the gate bus lines 15 as described above, are generated regardless of the presence or absence of applied voltage to the liquid crystal layer 3 provided between the picture element electrodes 12 and the counter substrate 2. Therefore, in the liquid crystal display device 10 which performs normally black mode display, when the liquid crystal molecules 3a in the vicinity of the edges of the source bus lines 16 or the gate bus lines 15 tilt by the alignment regulating force of the oblique electric fields under no applied voltage, light leakage may occur and the contrast ratio may decrease. The problem of light leakage is particularly prominent in the vicinity of the edges of the gate bus lines 15, owning to the fact that a comparatively large voltage (off voltage) for turning OFF the TFTs is applied to the gate bus lines 15 substantially all the time.

In the liquid crystal display device 10 of the present embodiment, the edges of the source bus lines 16 or the gate bus lines 15 in the vicinity of the aperture portions 13 between the picture element electrodes 12 which overlap with the source bus lines 16 or the gate bus lines 15 are covered with the picture element electrodes 12. With this construction, the influence of the oblique electric fields generated in the vicinity of the edges of the source bus lines 16 or the gate bus lines 15 is electrically blocked (shielded). Therefore, the liquid-crystal molecules 3a in the liquid crystal layer 3 do not tilt by the alignment regulating force of the oblique electric fields. The electric fields generated between the source bus lines 16 and the counter electrode 22 or between the gate bus lines 15 and the counter electrode 22 may tilt the liquid crystal molecules 3a of the liquid crystal layer 3 in the aperture portions 13 provided between the picture element electrodes 12 which overlap with the source bus lines 16 or the gate bus lines 15. However, in the case that the source bus lines 16 or the gate bus lines 15 are made of a light-shielding material, light does not pass through the aperture portions 13 overlapping with the source bus lines 16 or the gate bus lines 15.

Therefore, when the source bus lines 16 or the gate bus lines 15 are made of a light-shielding material, a decrease of contrast ratio caused by light leakage when black display is performed is suppressed, and display quality is further improved.

Further, when the source bus lines 16 or the gate bus lines 15 are made of a light-shielding material, non-uniformity within the display surface, that is, local variations in contrast ratio can be suppressed, and display quality can be improved.

By the oblique electric fields generated in the vicinity of the edges of the source bus lines 16 or the gate bus lines 15, residual potential is easily generated in the aperture portions 13 at which the insulating material is exposed. In this case, light leakage is caused when the liquid crystal molecules 3a in the aperture portion 13 adjacent to the source bus lines 16 or the gate bus lines 15 tilt by the residual potential. The extent to which the residual potential remains differs depending on a surface state of the insulating material. A surface state of the insulating material varies by the printing of the alignment film or the injection of the liquid crystal material.

Therefore, in the liquid crystal display device 10, the residual potential varies within the display surface. The variations of residual potential within the display surface cause the extent of light leakage to vary within the display surface. This results in local variations in contrast ratio, which in turn causes non-uniformity. Particularly, the gate bus lines 15 are the major cause of the non-uniformity since they receive a comparatively large voltage as described above.

In the liquid crystal display device 10 of the present embodiment, when the source bus lines 16 or the gate bus lines 15 are made of a light-shielding material, the source bus lines 16 or the gate bus lines 15 prevent passage of light through the aperture portion 13 which overlaps with the source bus lines 16 or the gate bus lines 15. In this way, the non-uniformity as described above is suppressed, and display quality is improved.

Moreover, in the liquid crystal display device shown in FIG. 3(a), there are regions in the vicinity of the edges of the source bus lines 16 where an electrically conductive film for the picture element electrodes 12 is formed and is not formed. Therefore, in the region where the electrically conductive film is not formed in the vicinity of the edges of the source bus lines 16, the surface of the TFT substrate 1 absorbs the impurity ions by the electric fields generated by the source bus lines 16. The charge of the absorbed impurity ions (hereinafter referred to as "stored charge") disturbs alignment. Because of this, for example, even when the source bus lines 16 are made of a light-shielding material, the alignment disturbance caused by the stored charge occurs in the aperture portions 13 in the vicinity of the source bus lines 16, with the result that light leakage is caused.

However, in the liquid crystal display device 10 of the present embodiment, a region where light leakage occurs due to the influence of the electric fields generated by the source bus lines 16, that is, in the vicinity of the edges of the source bus lines 16 has a large number of regions where the conductive film for the picture element electrodes 12 is formed. This suppresses the alignment disturbance caused by the stored charge, thereby suppressing light leakage.

Moreover, the impurity which generates the stored charge is not distributed evenly in the display surface but is typically localized in a stripe pattern within the display surface. This is because the impurity concentrates in regions between a plurality of injection ports where the flow rate is slow, when the liquid crystal material is injected through the injection ports disposed at predetermined intervals. Therefore, the stripe regions of localized impurity (regions containing a large amount of impurity) and the other regions (regions containing a small amount of impurity) contain (or do not contain) stored charge to different extents. Accordingly, the extent of light leakage also differs between these two regions. As a result, in the liquid crystal display device shown in FIG. 3(a), the stripe regions appear as a "black stripe" brighter than the other regions or a "white stripe" darker than the other regions. This causes display non-uniformity.

However, in the liquid crystal display device 10 of the present embodiment, because the light leakage caused by the stored charge is suppressed as described above, the display non-uniformity is also suppressed.

Note that, even though the foregoing mainly described the aperture potions 13 adjacent to the source bus lines 16, the present invention is not limited to this. That is, the effect of suppressing the alignment disturbance in the liquid crystal domains, and the resulting effect of suppressing a decrease of response speed (deterioration of response characteristics) and suppressing the afterimage phenomenon remain the same also for the aperture potions 13 adjacent to the gate bus lines 15.

Here, from the viewpoint of suppressing the alignment disturbance caused by the oblique electric fields generated in the vicinity of the edges of the source bus lines 16 or the gate bus lines 15, it is preferable to increase a proportion of the portion where the picture element electrodes 12 overlap with the source bus lines 16 or the gate bus lines, that is, it is preferable to cover a large portion on the edges of the picture element electrodes 12. In the case that the source bus lines 16 or the gate bus lines 15 are made of a light-shielding material, a decrease in aperture ratio caused by the increased proportion of the overlapping portion may pose a problem. Therefore, a proportion of the portion where the picture element electrodes 12 overlap with the source bus lines 16 or the gate bus lines 15 should be set in consideration of desired response characteristics and the aperture ratio, and according to use of the liquid crystal display device.

Note that, in order to vertically align the liquid crystal molecules having negative dielectric anisotropy, a vertical alignment film (not shown) is typically formed on the surfaces of the picture element electrodes 12 and the counter electrode 22 on the liquid crystal layer 3 side.

A nematic liquid crystal material having negative dielectric anisotropy is used as the liquid crystal material. By adding a dichroic pigment to the nematic liquid crystal material having negative dielectric anisotropy, a liquid crystal display device of the guest-host mode may be realized. The liquid crystal display device of the guest-host mode does not require a polarization plate.

Referring to FIG. 4, the foregoing described the case where the edges of the source bus lines 16 do not affect the liquid crystal molecules 3a when the picture element electrodes 12 partially overlap with the source bus lines 16. However, in the case that the source bus lines 16 are too close to the liquid crystal layer 3, the source bus lines 16 may affect the oblique electric fields on the edges of the picture element electrodes even when the picture element electrodes 12 partially overlap with the source bus lines 16. In this case, the liquid crystal molecules 3a may be affected.

Therefore, in order to prevent the liquid crystal molecules 3a from being adversely affected by the edges of the source bus lines 16 when the picture element electrodes 12 partially overlap with the source bus lines 16, it is preferable to form the interlayer insulation film 18 made of an organic insulating film or the like as thick as possible on the source bus lines 16, and form the picture element electrodes 12 thereon. Note that, the thickness of the interlayer insulation film 18 is preferably not less than 1.5 μm and not more than 3.5 μm. This is because, if it is too thick, it becomes difficult to make contact with the upper and lower layers.

Moreover, as it is clear from FIG. 3(a), an aperture width S, which is an interval of the aperture portions 13 between the picture element electrodes 12, needs to be wider than a predetermined width in order to obtain oblique electric fields needed to obtain stable tilt alignment. This is because, if the aperture width S is narrow, the oblique electric fields on the edges of the picture element electrodes 12 affect each other to prevent the formation of oblique electric fields necessary for adequate dividing.

Figure 5:
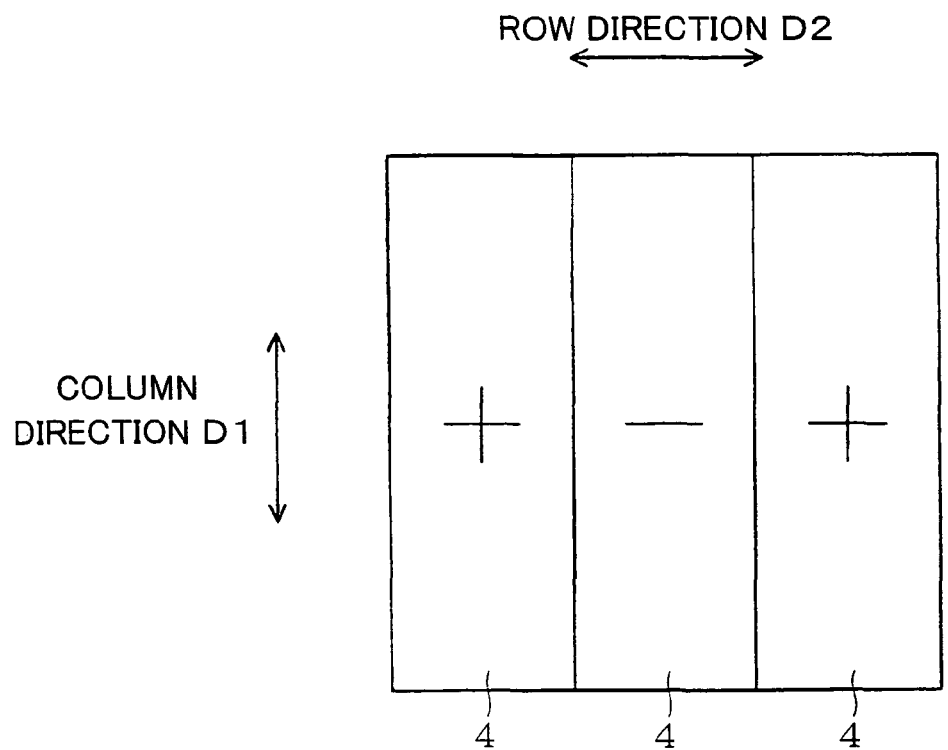
FIG. 5 is a plan view schematically showing a state in which a voltage of different polarities is applied to adjacent picture element regions disposed in a row direction of the liquid crystal display device.

In consideration of these problems, in the liquid crystal display device 10 of the present embodiment, as shown in FIG. 5, adjacent picture elements in a row direction D2 are driven with the reversed polarity within one frame. Therefore, even when the aperture width S between the picture element electrodes 12 in the row direction D2 is narrow, it is possible to obtain enough alignment regulating force as compared with the case that adjacent picture elements in the row direction D2 are not driven with the reversed polarity. This is because, when the adjacent picture elements in the row direction D2 are driven with the reversed polarity, stronger oblique electric fields can be generated as compared with the case that these picture elements are not driven with the revered polarity.

The reason for this is explained below with reference to FIG. 6 and FIG. 7.

Figure 6:
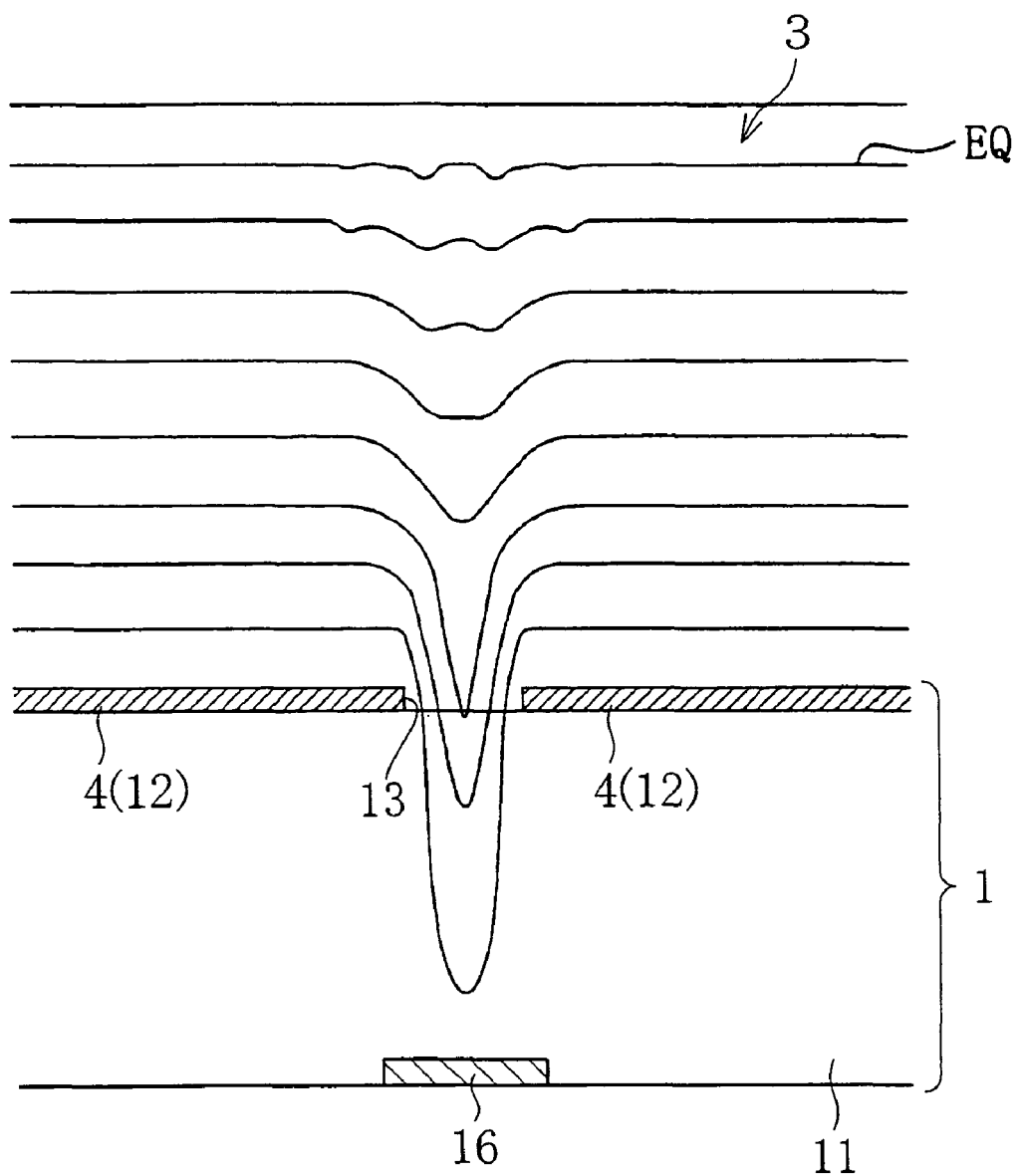
FIG. 6 is a cross sectional view schematically showing equipotential lines that are obtained when a voltage of the same polarity is applied to two adjacent picture element regions disposed in a row direction.

FIG. 6 schematically shows equipotential lines EQ generated when a voltage of +5 V is applied to the liquid crystal layer 3 in two adjacent picture element regions 4 disposed in the row direction D2. FIG. 7 schematically shows equipotential lines EQ generated when a voltage of +5 V is applied to the liquid crystal layer 3 in one of two adjacent picture element regions 4 disposed in the row direction D2, and when a voltage of −5 V is applied to the liquid crystal layer 3 in the other picture element region 4. As shown in FIG. 6, in the case that a voltage of the same polarity is applied to the liquid crystal layer 3 in the two adjacent picture element regions 4, electric fields are formed in which the equipotential lines EQ form a continuous curve.

Figure 7:
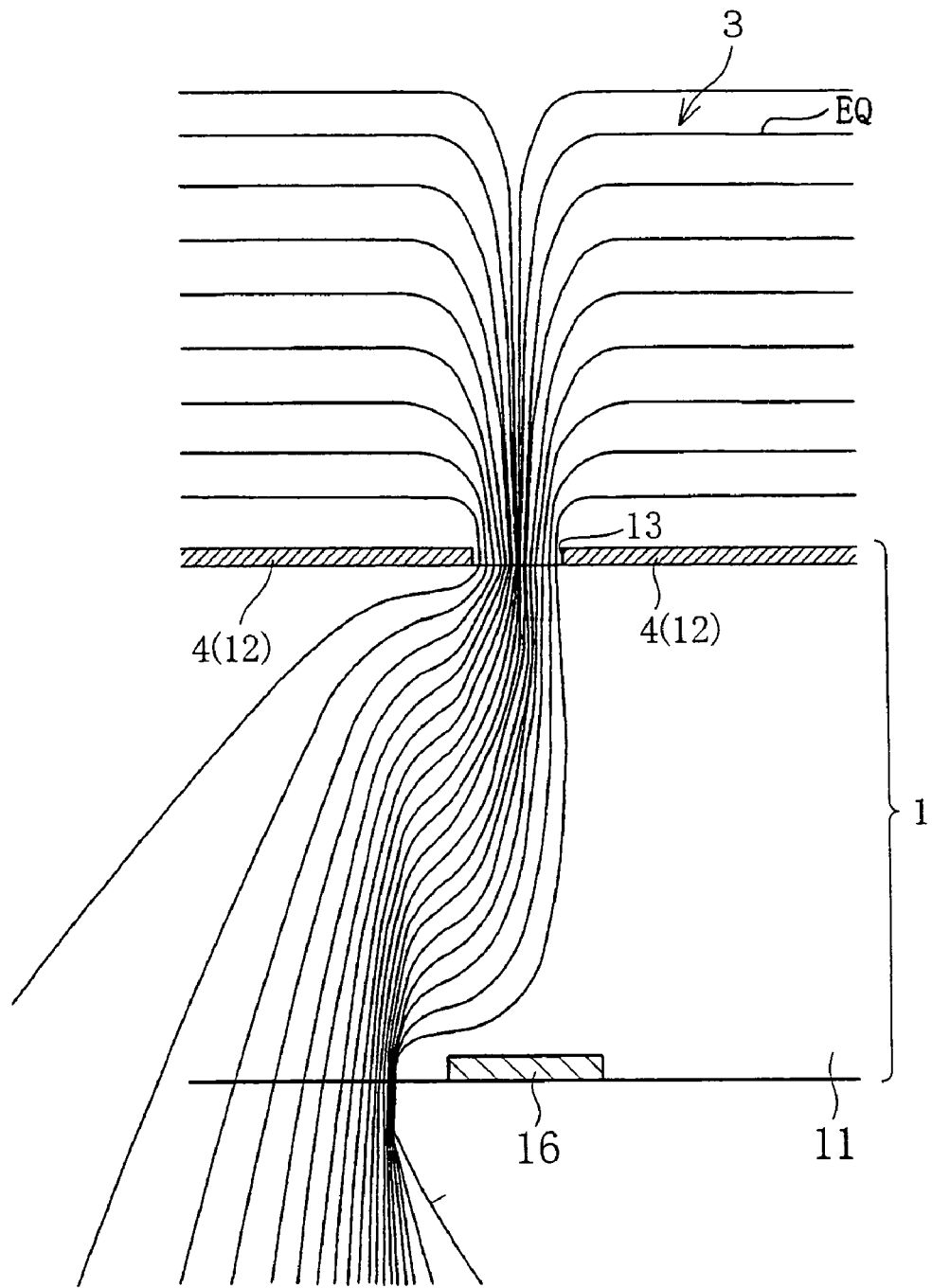
FIG. 7 is a cross sectional view schematically showing equipotential lines that are obtained when a voltage of different polarities is applied to two adjacent picture element regions disposed in a row direction.
Figure 8:
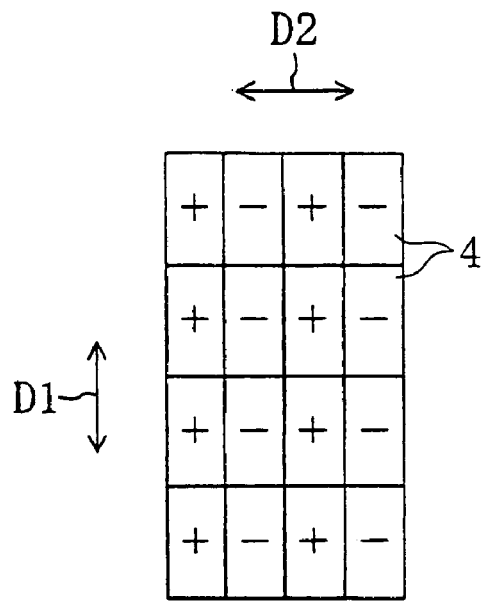
FIG. 8(a) is a plan view showing a state in which the polarity of a voltage applied to a liquid crystal layer in an arbitrarily selected first picture element region is different from the polarity of a voltage applied to the liquid layer in a second picture element region which belongs to the same row as the first picture element region and belongs to a column adjacent to the first region.
FIG. 8(b) is a plan view showing a state in which, within one frame, the polarity of a voltage applied to the liquid crystal layer in a plurality of picture element regions of a column is reversed every two rows.
FIG. 8(c) is a plan view showing picture element regions under dot-inversion.
Figure 8:
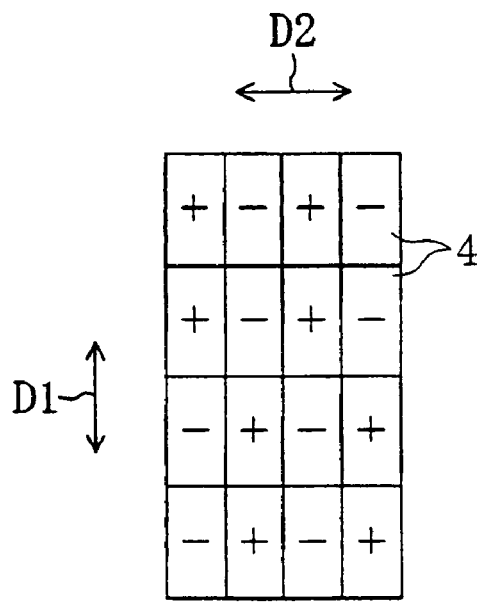
Figure 8:
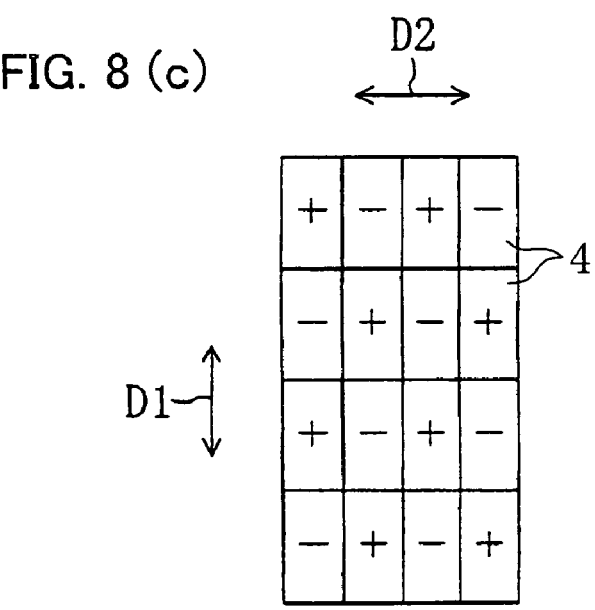

On the other hand, as shown in FIG. 7, in the case that a voltage of different polarity is applied to the liquid crystal layer 3 in the two adjacent picture element regions 4, the equipotential lines EQ representing the electric field generated in each of the two picture element regions 4 do not form continuous lines but drop dramatically on the aperture portions 13. Therefore, around the edge portions of the aperture portions 13, that is, around the picture element electrodes 12, a steep potential gradient is formed, and a resultant oblique electric field is stronger than the one shown in FIG. 6.

As described above, in the case that the picture element regions 4 adjacent to each other in the row direction D2 are driven with the reversed polarity, it is possible to obtain a sufficient alignment regulating force even if the aperture width S of the aperture portion 13 in the row direction D2 is narrow. Therefore, adequately stable tilt alignment can be obtained even in the arrangement in which the distance between the picture element electrodes 12 adjacent to each other in the row direction D2 is short and the aperture ratio is high.

In the present embodiment, the aperture ratio can be improved adequately even when the picture elements are not driven with the reversed polarity in the column direction D1 as shown in FIG. 8(a) (so-called source line reverse-driving), provided that the picture element regions 4 adjacent to each other in the row direction D2 are driven with the reversed polarity. However, from the viewpoint of reducing the source bus line-picture element electrode capacitance, it is preferable that adjacent picture element regions 4 in the row direction D2 be driven with the reversed polarity, and that the picture elements in the column direction D1 be driven with the reversed polarity every n row(s) (n is an integer of not less than 1). That is, within one frame, it is preferable that the polarity of an applied voltage to the liquid crystal layer 3 in the picture element regions 4 of a column be reversed every n row(s).

For example, as shown in FIG. 8(b), the picture element regions 4 in the column direction D1 may be driven with the reversed polarity every 2 rows (so-called 2H dot reverse-driving). Alternatively, as shown in FIG. 8(c), the picture element regions 4 in the column direction D1 may be driven with the reversed polarity every single row (so-called dot reverse-driving). In FIG. 8(c), adjacent picture element regions 4 in the row direction D2 are driven with the reversed polarity and adjacent picture element regions 4 in the column direction D1 are driven with the reversed polarity every single row. In other words, the polarity of a driving voltage is reversed for adjacent picture element regions 4 in the column direction D1. Therefore, it is possible to reduce the intervals between adjacent picture element electrodes 12 in the column direction D1, and to further improve the aperture ratio.

Figure 9:
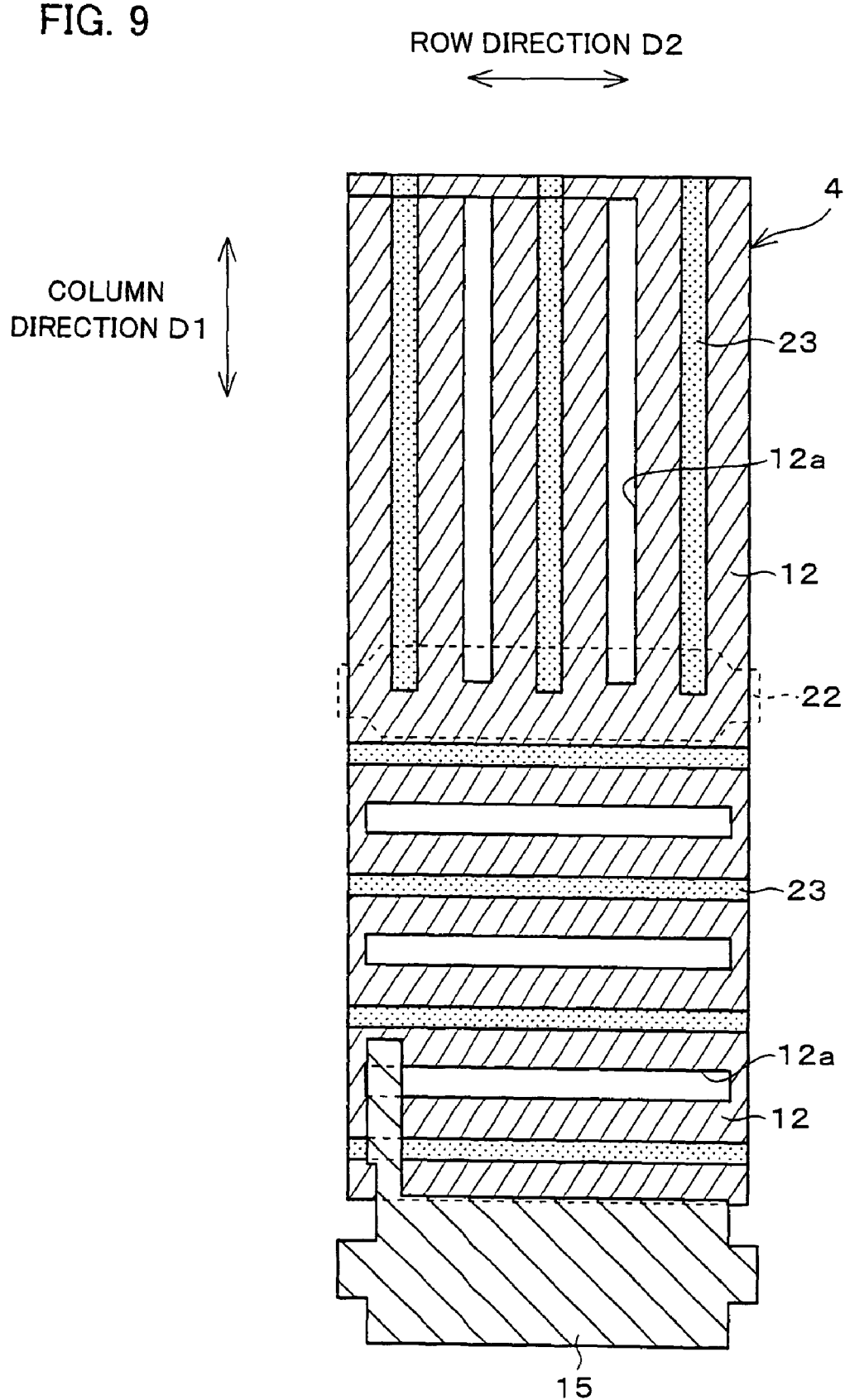
FIG. 9 is a plan view showing a modification example of a picture element region in the liquid crystal display device.
Figure 10:
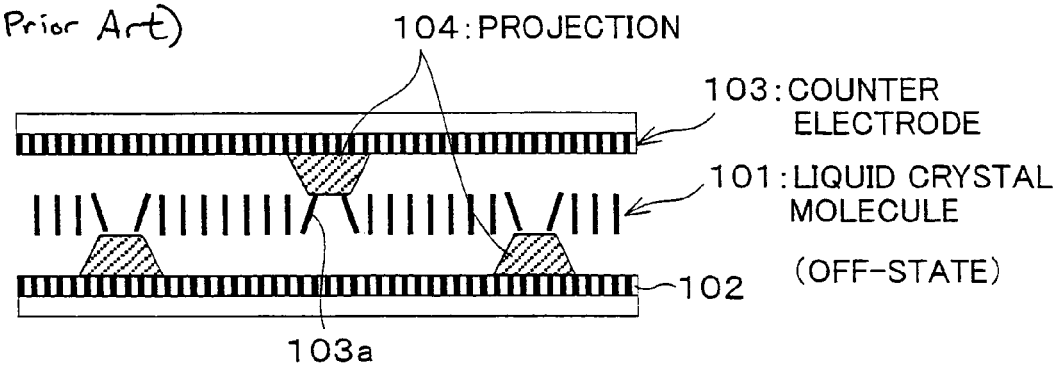
FIG. 10(a) is a cross sectional view showing an alignment state of liquid crystal molecules in an OFF-state in a conventional liquid crystal display device in which projections are formed.
FIG. 10(b) is a cross sectional view showing an alignment state of liquid crystal molecules in an ON-state in the conventional liquid crystal display device in which projections are formed.
Figure 10:
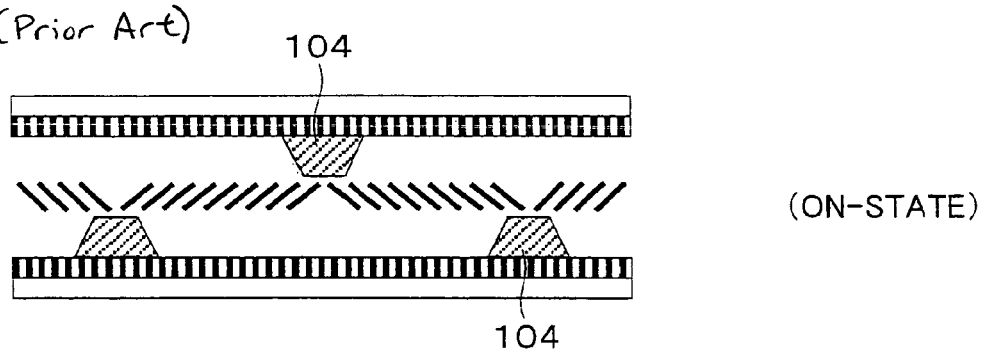
Figure 12:
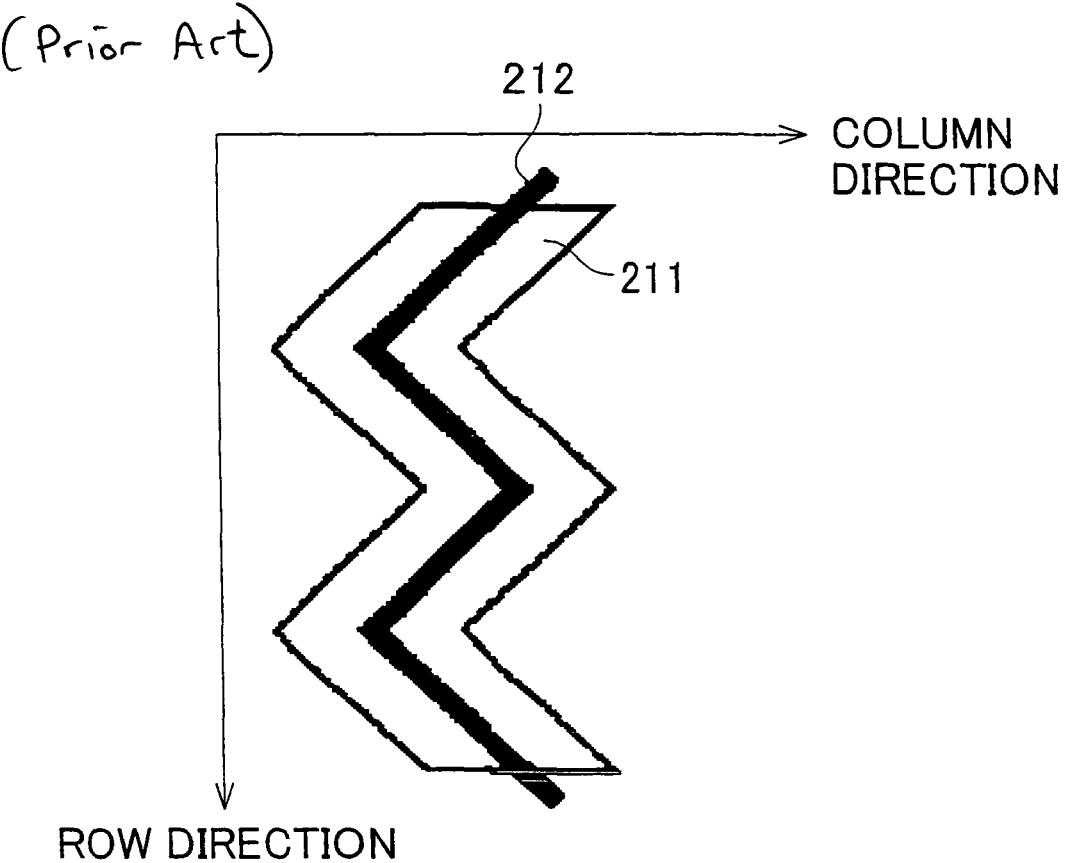
FIG. 12 is a plan view showing a picture element region in still another conventional liquid crystal display device.
Figure 13:
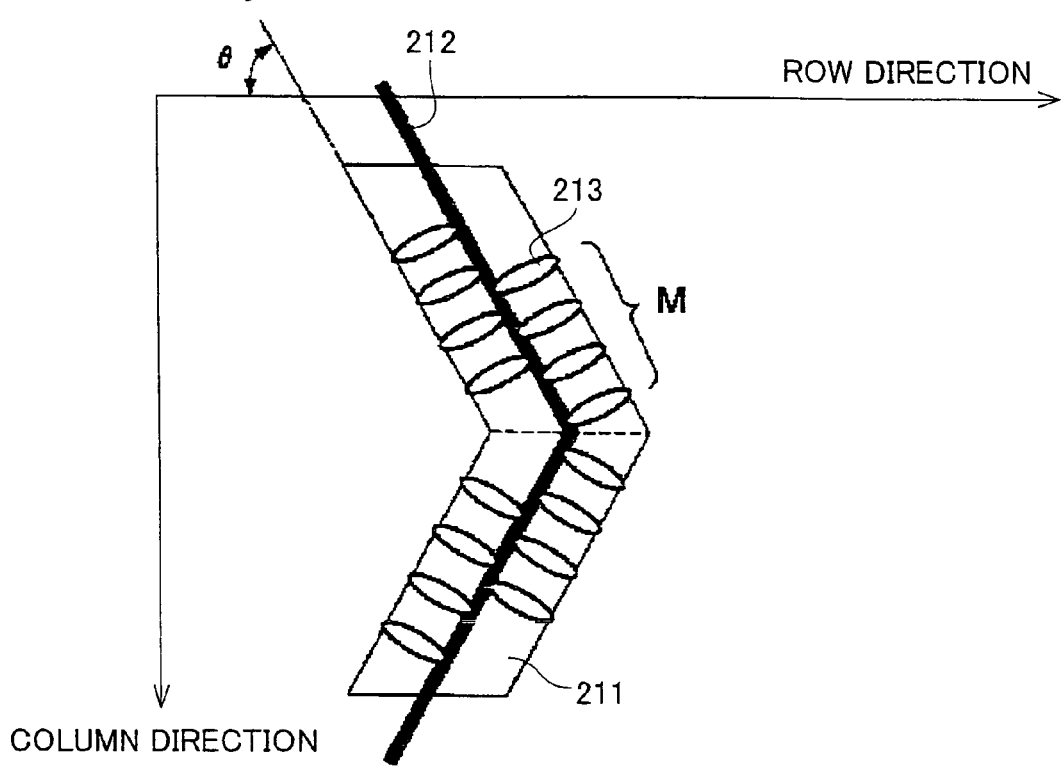
FIG. 13 is a plan view showing an alignment state of liquid crystal molecules in a picture element region in the liquid crystal display device.
Figure 14:
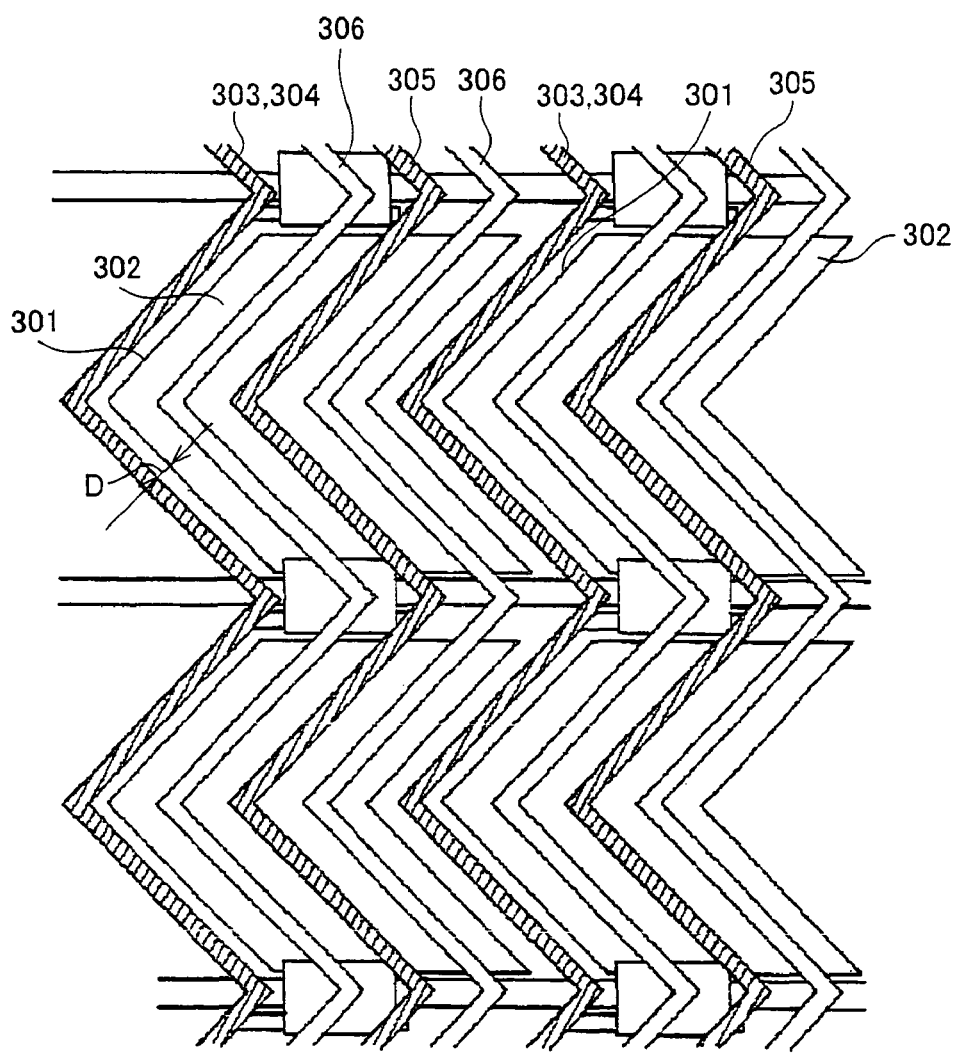
FIG. 14 is a plan view showing picture element regions in yet another conventional liquid crystal display device.

Note that, the present invention is not limited to the above embodiment, but may be modified in various ways within a scope of the present invention. For example, in the above embodiment, the picture element electrodes 12 are formed in a zigzag pattern; however, the present invention is not limited to this. For example, as shown in FIG. 9, the picture element electrodes 12, the picture element slits 12a, and the counter ribs 23 in each picture element region 4 may be provided in a vertical direction in the upper half of the diagram in FIG. 9, and in a horizontal direction in the lower half of the diagram in FIG. 9.

The effects of the present invention can also be obtained with the above arrangement. However, in this arrangement, it is preferable that the polarization axes of the polarization plates be inclined in an X-shape with respect to the liquid crystal panel. The reason for this is explained with reference to FIG. 9. In FIG. 9, the alignment direction of the liquid crystal molecules 3a takes the form of "+". Therefore, the alignment direction of the liquid crystal molecules 3a and the direction of the polarization axis coincide if the polarization axis also has a "+" shape. In this case, black display results even when the liquid crystal molecules 3a tilt.

As above, in the liquid crystal display device 10 of the present embodiment, the liquid crystal layer 3 has a vertically aligned state when no voltage is applied. When a voltage is applied, a plurality of liquid crystal domains are formed in each of which tilt alignment is obtained by the oblique electric fields generated by the counter ribs 23 and the picture element slits 12a. Display is carried out as the aligned state of each liquid crystal domain varies depending on an applied voltage.

In the liquid crystal display device 10, bus lines such as the source bus lines 16 are generally provided in each aperture portion 13. In this case, the edges of the picture element electrodes affect the alignment imparted by the picture element electrodes 12. Therefore, conventionally, the adverse effect of the bus lines on the picture element electrodes 12 has been suppressed by, for example, forming the counter ribs 23 at the edges of the picture element electrodes.

However, in the present embodiment, the edge portions of the picture element electrodes 12 on the opposite sides of the aperture portions 13 provided between the picture element electrodes 12 are facing parallel to each other with a certain interval.

Since the liquid crystal molecules 3a are tilted by the oblique electric fields generated by the edge portions of the picture element electrodes 12 on the opposite sides of the aperture portion 13, it is possible to form liquid crystal domains in which the tilt alignment of the liquid crystal molecules 3a at every edge of the picture element electrodes 12 evenly conforms to the tilt alignment of the liquid crystal molecules 3a in each region of the picture element electrodes 12.

That is, in the present embodiment, the alignment of the liquid crystal molecules 3a is controlled by effectively using the oblique electric fields generated by the aperture portions 13, in other words, the oblique electric fields generated by the edges of the picture element electrodes 12.

As a result, it is unnecessary to form projections on the source bus lines 16 along the direction of extension. Therefore, the number of manufacturing steps will not increase.

Moreover, in the present embodiment, the gate bus lines 15 and the source bus lines 16 are provided (i) along the aperture portions 13 formed between the picture element electrodes 12, (ii) beneath the picture element electrodes 12, and (iii) at the edge portions of the picture element electrodes 12 by overlapping therewith in a direction of thickness.

Moreover, in the liquid crystal display device 10 of the present embodiment, the source bus line 16, which is provided beneath the picture element electrodes 12, is provided for each aperture portion 13 along therewith. Further, the source bus line 16 overlaps with the edge portions of the picture element electrodes 12 in a direction of thickness.

Thus, the edges of each source bus line 16 are covered with the picture element electrodes 12. Therefore, in the vicinity of the aperture portion 13 of the picture element electrodes 12, the adverse effect of the oblique electric fields generated in the vicinity of the edges of the source bus line 16 is electrically blocked (shielded) by the picture element electrodes 12. Accordingly, the liquid crystal molecules 3a in the liquid crystal layer 3 do not receive the alignment regulating force of the oblique electric fields generated in the vicinity of the edges of the source bus line 16, and the alignment of the liquid crystal molecules 3a is regulated only by the oblique electric fields generated on the edge portions of the aperture portion 13.

Therefore, in the liquid crystal display device 10 of the present embodiment, there will be no alignment disturbance in the liquid crystal domains formed on the picture element electrodes 12 which overlap with the source bus lines 16. As a result, it is possible to suppress decrease of response speed (deterioration of response characteristics) and generation of the afterimage phenomenon.

Moreover, because the source bus lines 16 overlap with the edge portions of the picture element electrodes 12, there is no gap between the source bus lines 16 and the picture element electrodes 12. Therefore, unlike the conventional examples, there will be no decrease in the aperture ratio caused by blocking the passage of light through the gap between the bus lines and the picture element electrodes.

Therefore, by effectively controlling alignment of the picture element electrodes 12, the liquid crystal display device 10 can realize domain division without forming projections on the source bus lines 16 and without lowering aperture ratio. The domain division can also be realized with strong alignment regulating force for the liquid crystal and with superior response characteristics.

Moreover, in the liquid crystal display device 10 of the present embodiment, the source bus lines 16 are made of a light-shielding material.

Therefore, with the source bus lines 16 made of a light-shielding material, portions in the picture-element-electrode aperture portion 13 where the liquid crystal molecules 3a tilt in opposite directions by the oblique electric fields generated at the edge portions of the picture element electrodes 12 can be hidden.

Moreover, in the liquid crystal display device 10 of the present embodiment, picture-element-region alignment regulating means for generating the oblique electric fields is provided in the picture element region 4. Therefore, a plurality of domains with different tilt directions for the liquid crystal molecules 3a can be formed within a region of a single picture element electrode 12.

Moreover, in the liquid crystal display device 10 of the present embodiment, the picture-element-region alignment regulating means is the picture element slit 12a formed in each picture element electrode 12. With the oblique electric fields generated by the picture element slit 12a formed in each picture element electrode 12, the liquid crystal display device 10 can realize domain division with strong alignment regulating force for the liquid crystal and with superior response characteristics.

Moreover, in the liquid crystal display device 10 of the present embodiment, the picture-element-region alignment regulating means is the counter rib 23 which is formed on the counter electrode 22 and projects into the liquid crystal layer 3. With the oblique electric field generated by the counter rib 23, the liquid crystal display device 10 can be realized with strong alignment regulating force for the liquid crystal and with superior response characteristics Moreover, in the liquid crystal display device 10 of the present embodiment, the bus line is the source bus line 16 which is provided beneath the picture element electrodes 12.

Therefore, the source bus lines 16 do not disturb the alignment in the liquid crystal domains in the regions of the picture element electrodes 12. Moreover, it is unnecessary to shield the gap between the source bus lines 16 and the picture element electrodes 12 with the black matrix. As a result, the aperture ratio can be improved.

Furthermore, the alignment regulating direction imparted by the oblique electric fields generated at the edges of the picture element electrodes coincides with the alignment regulating direction imparted by the picture-element-region alignment regulating means. By thus utilizing the edges of the picture element electrodes, it is unnecessary to form projections on the source bus lines 16. Moreover, a region, which conventionally existed at the edge portion of the picture element electrode, which tilts in a direction which differs from the four domain tilting direction, decreases. Therefore, it is possible to improve transmittance and the response characteristic.

Moreover, the liquid crystal display device 10 of the present embodiment may be adapted so that the gate bus lines 15 overlap with the picture element electrodes 12. With this construction, it is possible to effectively suppress decrease of response speed and generation of the afterimage phenomenon. This is because the oblique electric fields generated in the vicinity of the edges of the gate bus lines 15 affects the liquid crystal molecules 3a more than the oblique electric fields generated in the vicinity of the edges of the source bus lines 16 does, owning to the fact that the voltage applied to the gate bus lines 15 is generally greater than that applied to the source bus lines 16.

Moreover, in the liquid crystal display device 10 of the present embodiment, the picture element electrodes 12 and the picture-element-electrode aperture portions 13 are bent in a zigzag fashion, and the source bus lines 16 are also bent in a zigzag fashion along the picture-element-electrode aperture portions 13.

With this, it is possible to realize four-direction domain alignment in each region of the picture element electrodes 12, and the source bus lines 16 can be wired without adversely affecting the oblique electric fields generated at the edges of the picture element electrodes 12.

Moreover, in the liquid crystal display device 10 of the present embodiment, a plurality of the picture element electrodes 12 are arranged in a matrix with a plurality of rows and columns. Moreover, within one frame, the polarity of applied voltage to the liquid crystal layer 3 in a first picture element region arbitrarily selected from the picture element electrodes 12 is different from the polarity of applied voltage to the liquid crystal layer 3 in a second picture element region which belongs to the same row as the first picture element region and belongs to an adjacent column of the first picture element region.

That is, within a period (one frame) in which a signal is applied to all the picture elements, adjacent picture elements in the row direction are driven with the reversed polarity. Therefore, as compared with the case that adjacent picture elements in the row direction are not driven with the reversed polarity, an oblique electric field having a steep potential gradient can be generated between adjacent picture elements in the row direction.

As a result, even with an arrangement in which the distance between adjacent picture element electrodes in the row direction is short and the aperture ratio is high, it is possible to form adequately stable tilt alignment.

Moreover, when the picture element region 4 is long in the row direction, the distance between the picture element electrodes 12 is longer in the row direction than in the column direction. Therefore, reversing the polarity of an applied voltage to the liquid crystal layer 3 between the picture element electrodes 12 in the row direction is more effective than reversing the polarity of an applied voltage to the liquid crystal layer 3 between the picture element electrodes 12 in the column direction.

Moreover, in the liquid crystal display device 10 of the present embodiment, within one frame, the picture elements adjacent to each other in the row direction are driven with the reversed polarity, and the picture elements in the column direction are driven with the reversed polarity every n rows, where n is an integer of 1 or greater.

Thus, in a plurality of picture elements 4 which belong to any column of the picture element regions 4, the polarity of an applied driving voltage to the liquid crystal layer 3 is reversed every n rows (n is an integer of 1 or greater). Therefore, it is possible to suppress flicker.

Moreover, in the liquid crystal display device 10 of the present embodiment, n may be 1. Specifically, within one frame, the polarity of a voltage for driving the picture elements is reversed for adjacent picture elements in the row direction, and the polarity of the voltage is also reversed for the picture elements of the column direction every n rows.

As above, the polarity of applied voltage to the picture elements of the column direction may be reversed every n rows, i.e., the polarity of applied voltage to the liquid crystal layer 3 in a first picture element region arbitrarily selected from the picture element regions 4 may be different from the polarity of applied voltage to the liquid crystal layer 3 in a third picture element region that is on the same column as the first picture element region and is on the adjacent row of the first picture element region. In this case, the oblique electric field having a steep potential gradient can also be generated between adjacent picture elements in the column direction.

This allows the distance between adjacent picture element electrodes 12 in the column direction to be reduced, thereby further improving aperture ratio.

Moreover, in the liquid crystal display device of the present invention, the bus line is made of a light-shielding material.

In the picture-element-electrode aperture portion, the oblique electric fields generated at the edge portions of the picture element electrodes tilts the liquid crystal molecules in opposite directions. However, with the bus line made of a light-shielding material, it is possible to hide such a portion of opposite tilt directions.

Moreover, in the liquid crystal display device of the present invention, picture-element-region alignment regulating means for generating the oblique electric field is provided in the picture element region in which the picture element electrodes are provided.

According to the above invention, the picture-element-region alignment regulating means for generating the oblique electric field is provided in the picture element region. Therefore, a plurality of domains with different tilt directions for the liquid crystal molecules can be formed within a region of a single picture element electrode.

Moreover, in the liquid crystal display device of the present invention, the picture-element-region alignment regulating means is a picture-element aperture portion formed in each picture element electrode.

According to the above invention, the picture-element-region alignment regulating means is the picture-element aperture portion formed in each picture element electrode. With the oblique electric fields generated in the picture-element aperture portion formed in each picture electrode, the liquid crystal display device can realize domain division with strong alignment regulating force for the liquid crystal and with superior response characteristics.

Moreover, in the liquid crystal display device of the present invention, the picture-element-region alignment regulating means is a projection formed on the counter electrode and projects into the liquid crystal layer.

According to the above invention, the picture-element-region alignment regulating means is a projection which is formed on the facing electrode and projects into the liquid crystal layer. With the oblique electric field generated by the projection formed on the counter electrode and projects into the liquid crystal layer, the liquid crystal display device can realize domain division with strong alignment regulating force for the liquid crystal and with superior response characteristics.

Moreover, in the liquid crystal display device of the present invention, the bus line is a source bus line.

According to the above invention, the bus line is the source bus line. Therefore, the source bus line does not disturb the alignment in the liquid crystal domains in regions of the picture element electrodes. Moreover, it is unnecessary to shield the gap between the source bus lines and the picture element electrodes with the black matrix. Therefore, the aperture ratio can be improved.

Moreover, in the liquid crystal display device of the present invention, the bus line is a gate bus line.

According to the above invention, the bus line is the gate bus line. By adopting an arrangement in which the gate bus line overlaps with the picture element electrode, it is possible to effectively suppress decrease of response speed and generation of the afterimage phenomenon. This is because the oblique electric fields generated in the vicinity of the edges of the gate bus line affects the liquid crystal molecules more than the oblique electric fields generated in the vicinity of the edges of the source bus line does, owning to the fact that the voltage applied to the gate bus lines is generally greater than that applied to the source bus lines.

Moreover, in the liquid crystal display device of the present invention, the picture element electrodes and the picture-element-electrode aperture portions are bent in a zigzag fashion, and the source bus lines are also bent in a zigzag fashion along the picture-element-electrode aperture portions.

According to the above invention, the picture element electrodes and the picture-element-electrode aperture portions are bent in a zigzag fashion, and the source bus lines are also bent in a zigzag fashion along the picture-element-electrode aperture portions.

With this, it is possible to realize four-direction domain alignment in each picture element electrode, and the source bus line can be wired without affecting the oblique electric fields generated at the edges of the picture element electrode.

Moreover, in the liquid crystal display device of the present invention, a plurality of picture element regions are arranged in a matrix with a plurality of rows and columns, and within one frame, the polarity of applied voltage to the liquid crystal layer in a first picture element region arbitrarily selected from the picture element regions is different from the polarity of applied voltage to the liquid crystal layer in a second picture element region which belongs to the same row as the first picture element region and belongs to an adjacent column of the first picture element region.

According to the above invention, a plurality of the picture element regions are arranged in a matrix with a plurality of rows and columns. Moreover, within one frame, the polarity of applied voltage to the liquid crystal layer in a first picture element region arbitrarily selected from the picture element regions is different from the polarity of applied voltage to the liquid crystal layer in a second picture element region which belongs to the same row as the first picture element region and belongs to an adjacent column of the first picture element region.

That is, within a period (one frame) in which a voltage is applied to all the picture elements, the polarity of a voltage for driving the picture elements is reversed for adjacent picture elements in the row direction. Therefore, as compared with the case that adjacent picture elements in the row direction are not driven with the reversed polarity, the oblique electric field having a steep potential gradient can be generated between adjacent picture elements in the row direction.

As a result, even with an arrangement in which the distance between adjacent picture element electrodes in the row direction is short and the aperture ratio is high, it is possible to form adequately stable tilt alignment.

Moreover, when the picture element region is long in the row direction, the distance between the picture element electrodes is longer in the row direction than in the column direction. Therefore, reversing the polarity of an applied voltage to the liquid crystal layer between the picture element electrodes in the row direction is more effective than reversing the polarity of an applied voltage to the liquid crystal layer between the picture element electrodes in the column direction.

In the liquid crystal display device of the present invention, within one frame, the polarity of applied voltage to the liquid crystal layer in a plurality of picture element regions which belong to any column of the picture element regions is reversed every n rows, where n is an integer of 1 or greater.

In the invention, within one frame, adjacent picture elements in the row direction are driven with the reversed polarity and the picture elements in the column direction are driven with the reversed polarity every n rows, where n is an integer of 1 or greater.

Thus, in a plurality of picture elements which belong to any column of the picture element regions, the polarity of an applied voltage to the liquid crystal layer 3 is reversed every n rows (n is an integer of 1 or greater) Therefore, it is possible to suppress flicker.

Moreover, in the liquid crystal display device of the present embodiment, n is 1.

According to the invention, n is 1. Specifically, within one frame, the polarity of a voltage for driving the picture elements is reversed for adjacent picture elements in the row direction, and the polarity of the voltage is also reversed for the picture elements of the column direction every n rows.

As above, the polarity of applied voltage to the picture elements of the column direction may be reversed every n rows, i.e., the polarity of the voltage applied to the liquid crystal layer in a first picture element region arbitrarily selected from the picture elements regions may be different from the polarity of applied voltage to the liquid crystal layer in a third picture element region that is on the same column as the first picture element region and is on the adjacent column of the first picture element region. In this case, the oblique electric field having a steep potential gradient can also be generated between adjacent picture elements in the column direction.

This allows the distance between adjacent picture element electrodes in the column direction to be reduced, thereby further improving aperture ratio.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A liquid crystal display device comprising:
   a first substrate having a plurality of picture element electrodes;
   a second substrate having a counter electrode and sandwiching a liquid crystal layer with said first substrate; and
   a bus line serving as a gate bus line,
   wherein the picture element electrodes are disposed so that edge portions of the picture element electrodes on opposite sides of a picture-element-electrode aperture portion formed between the picture element electrodes face parallel to each other at certain intervals,
   wherein the bus line is provided (i) along the picture-element-electrode aperture portion formed between the picture element electrodes, (ii) beneath the picture element electrodes, and (iii) at the edge portions of the picture element electrodes by overlapping with the edge portions in a direction of thickness, and wherein the picture element electrodes overlap the gate bus line but do not overlap any source bus lines; and
   wherein the bus line selects the picture electrodes to which a display voltage is applied, and in response to the applied display voltage, a plurality of domains with different alignment directions for liquid crystal molecules are formed within a region of each picture element electrode.

2. The liquid crystal display device as set forth in claim 1, wherein the bus line is made of a light-shielding material.

3. The liquid crystal display device as set forth in claim 1, further comprising an auxiliary capacitance line for forming an auxiliary capacitance.

4. The liquid crystal display device as set forth in claim 1, further comprising an interlayer insulating film on the bus line.

5. The liquid crystal display device as set forth in claim 4, wherein the interlayer insulating film has a thickness in a range of not less than 1.5 µm and not more than 3.5 µm.

6. The liquid crystal display device as set forth in claim 1, further comprising picture-element-region alignment regulating means for generating an oblique electric field, the picture-element-region alignment regulating means being provided in a picture element region in which the picture element electrodes are provided.

7. The liquid crystal display device as set forth in claim 6, wherein the picture-element-region alignment regulating means comprises a picture-element aperture portion formed for each picture element electrode.

8. The liquid crystal display device as set forth in claim 6, wherein the picture-element-region alignment regulating means comprises a projection formed on the counter electrode and projects into the liquid crystal layer.

9. The liquid crystal display device as set forth in claim 6, wherein the picture-element-region alignment regulating means comprises a projection on the counter electrode that projects into the liquid crystal layer, and an aperture in the pixel electrode.

10. The liquid crystal display device as set forth in claim 8, wherein a height of the projection projecting into the liquid crystal layer is not less than 1 µm and not more than 1.5 µm.

11. The liquid crystal display device as set forth in claim 1, wherein the picture element electrodes and the picture-element-electrode aperture portion are bent in a zigzag fashion, and wherein a source bus line is also bent in a zigzag fashion along the picture-element-electrode aperture portion.

12. The liquid crystal display device as set forth in claim 1, wherein:
   picture element regions in which the picture element electrodes are provided are arranged in a matrix with a plurality of rows and columns, and
   within one frame, a polarity of applied voltage to the liquid crystal layer in a first picture element region arbitrarily selected from the picture element regions is different from a polarity of applied voltage to the liquid crystal layer in a second picture element region which belongs to the same row as the first picture element region and belongs to an adjacent column of the first picture element region.

13. The liquid crystal display device as set forth in claim 12, wherein, within one frame, a polarity of applied voltage to the liquid crystal layer in a plurality of picture element regions which belong to any column of the picture element regions is reversed every n rows, where n is an integer of 1 or greater.

14. The liquid crystal display device as set forth in claim 13, wherein said n is 1.

* * * * *